US012603525B1

(12) United States Patent
Hu et al.

(10) Patent No.: US 12,603,525 B1
(45) Date of Patent: Apr. 14, 2026

(54) SWITCHED CAPACITOR CONVERTERS FOR WIRELESS POWER TRANSFER

(71) Applicant: Apple Inc., Cupertino, CA (US)

(72) Inventors: Zhiyuan Hu, Santa Clara, CA (US); Jizhen Fu, San Jose, CA (US); Weihong Qiu, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 18/457,701

(22) Filed: Aug. 29, 2023

Related U.S. Application Data

(60) Provisional application No. 63/476,101, filed on Dec. 19, 2022, provisional application No. 63/476,107, filed on Dec. 19, 2022.

(51) Int. Cl.
| | |
|---|---|
| *H02J 50/12* | (2016.01) |
| *H02J 50/80* | (2016.01) |
| *H02M 1/00* | (2007.01) |
| *H02M 7/219* | (2006.01) |

(52) U.S. Cl.
CPC .............. H02J 50/12 (2016.02); H02J 50/80 (2016.02); H02M 1/007 (2021.05); H02M 7/219 (2013.01)

(58) Field of Classification Search
CPC .......... H02J 50/12; H02J 50/80; H02M 1/007; H02M 7/219
See application file for complete search history.

(56) References Cited

U.S. PATENT DOCUMENTS

| | | | | |
|---|---|---|---|---|
| 6,697,271 | B2 * | 2/2004 | Corzine | ................ H02M 7/487 363/71 |
| 10,389,275 | B2 * | 8/2019 | Notsch | .............. H02M 3/33592 |
| 11,223,233 | B2 * | 1/2022 | Madawala | .............. H02J 50/12 |
| 11,387,666 | B2 | 7/2022 | Dalena | |
| 2005/0111246 | A1 * | 5/2005 | Lai | ......................... H02M 7/483 363/157 |
| 2013/0119961 | A1 | 5/2013 | Okuda | |
| 2014/0266135 | A1 | 9/2014 | Zhak | |
| 2016/0329809 | A1 | 11/2016 | Granato | |
| 2019/0260234 | A1 * | 8/2019 | Schumann | .............. H02J 50/80 |
| 2020/0389051 | A1 * | 12/2020 | Matsumoto | ............. H02M 1/32 |
| 2021/0188106 | A1 * | 6/2021 | Asa | ..................... H02M 1/4216 |
| 2022/0376616 | A1 | 11/2022 | Hu et al. | |

* cited by examiner

*Primary Examiner* — Rexford N Barnie
*Assistant Examiner* — Joseph N Inge
(74) *Attorney, Agent, or Firm* — FLETCHER YODER PC

(57) ABSTRACT

A wireless power receiver can include a receiver coil, with first and second rectifiers having respective inputs coupled respective terminals of the receiver coil, a first cascade of rectifier driven switched capacitor (RDSC) cells coupled between an output of the first rectifier and an output bus, and a second cascade of RDSC cells coupled between an output of the second rectifier and the output bus. A wireless power transmitter can include a first cascade of inverter driver switched capacitor (IDSC) cells coupled between a DC input bus and an input of a first inverter, a second cascade of one or more IDSC cells coupled between the DC input bus and an input of a second inverter, and a transmitter coil having a first terminal coupled to an output of the first inverter and a second terminal coupled to an output of the second inverter.

15 Claims, 20 Drawing Sheets

SWITCHED CAPACITOR CONVERTERS FOR WIRELESS POWER TRANSFER

CROSS-REFERENCE TO RELATED APPLICATIONS

This application claims priority to U.S. Provisional Application No. 63/476,101, filed Dec. 19, 2022, entitled "SWITCHED CAPACITOR CONVERTERS FOR WIRELESS POWER TRANSFER," and U.S. Provisional Application No. 63/476,107, filed Dec. 19, 2022, entitled "COIL DRIVEN SWITCHED CAPACITOR AND CONTROLLER FOR WIRED AND INDUCTIVE CHARGING," the disclosure of both are incorporated by reference in their entirety for all purposes.

BACKGROUND

Wireless power transfer ("WPT"), such as inductive power transfer ("IPT"), may be used to provide power for charging various battery-powered electronic devices. WPT has seen increased use in the consumer electronics space around devices such as mobile phones (i.e., smart phones) and their accessories (e.g., wireless earphones, smart watches, etc.) as well as tablets and other types of portable computers and their accessories (e.g., styluses, etc.). In some cases, wireless power transfer system efficiency may be dominated by conduction losses. As a result, in such systems higher operating efficiency can be achieved by increased operating voltages that all for the same level of power with reduced current, thus reducing conduction loss. However, when a wireless power transfer system is used for battery charging, increased operating voltage can decrease efficiency as battery charging circuits may employ regulation or conversion circuitry in which switching losses increase with the difference between the input voltage and the battery voltage. Thus, the design trade-offs between the wireless power transfer circuit efficiency and charging circuit efficiency can result in a configuration that is not optimal for either system.

SUMMARY

Thus, it may be desirable to provide wireless power transfer circuitry that allows for higher operating voltages while reducing the conversion ratio required of downstream battery charging circuitry, allowing for the reduction of both switching and conduction losses of the overall wireless power transfer and battery charger system.

A wireless power receiver can include a wireless power receiver coil configured to have an AC receiver input voltage induced thereacross by a wireless power transmitter, a first rectifier having an input coupled to a first terminal of the wireless power receiver coil, a second rectifier having an input coupled to a second terminal of the wireless power receiver coil, a first cascade of one or more rectifier driven switched capacitor (RDSC) cells coupled between an output of the first rectifier and an output bus, and a second cascade of one or more RDSC cells coupled between an output of the second rectifier and the output bus. Each RDSC cell can include a flying capacitor having a first terminal coupled to an input terminal of the RDSC cell and a second terminal, top switch having a first terminal coupled to the input terminal of the RDSC cell and the first terminal of the flying capacitor and a second terminal coupled to a first output terminal of the RDSC cell, thereby allowing the top switch to selectively couple first terminal of the flying capacitor to the first output terminal of the RDSC cell, a middle switch having a first terminal coupled to a second output terminal of the RDSC cell and a second terminal coupled to the second terminal of the flying capacitor, thereby allowing the middle switch to selectively couple the second terminal of the flying capacitor to the second output terminal of the RDSC cell, and a bottom switch having a first terminal coupled to the second terminal of the flying capacitor and the second terminal of the middle switch and a second terminal coupled to ground, thereby allowing the bottom switch to selectively couple the second terminal of the flying capacitor to ground. Each RDSC cell can further include a diode having its anode coupled to the second terminal of the flying capacitor and its cathode coupled to the wireless power receiver coil.

The first cascade of one or more RDSC cells can further include a first upstream RDSC cell having its input terminal coupled to the first rectifier and its first output terminal coupled to the output bus, and a first downstream RDSC cell having its input terminal coupled to the second output terminal of the first upstream RDSC cell and its first and second output terminals coupled to the output bus. Similarly, the second cascade of one or more RDSC cells further include a second upstream RDSC cell having its input terminal coupled to the second rectifier and its first output terminal coupled to the output bus and a second downstream RDSC cell having its input terminal coupled to the second output terminal of the second upstream RDSC cell and its first and second output terminals coupled to the output bus. The first and second cascades of RDSC cells can each further include one or more intermediate RDSC cells, with each intermediate RDSC cell having its input terminal coupled to an immediately upstream RDSC cell, its first output terminal coupled to the output bus, and its second output terminal coupled to an immediately downstream RDSC cell.

The wireless power receiver can further include control circuitry that operates the first cascade of one or more RDSC cells in a series mode when the AC receiver input current is in a positive half cycle and in a parallel mode when the AC receiver input current is in a negative half cycle and operates the second cascade of one or more RDSC cells in a series mode when the AC receiver input current is in a negative half cycle and in a parallel mode when the AC receiver input current is in a positive half cycle. The control circuitry can sequence switching of switching devices of each cascade of RDSC cells to achieve zero voltage switching.

The control circuitry can sequence switching a cascade of RDSC cells undergoing a parallel mode to series mode transition to achieve zero voltage switching by simultaneously turning off all top and bottom switches of the cascade of RDSC cells undergoing a parallel mode to series mode transition, turning off a low side switch of an rectifier coupled to the cascade of RDSC cells undergoing a parallel mode to series mode transition, turning on a high side switch of a rectifier coupled to the cascade of RDSC cells undergoing a parallel mode to series mode transition, and turning on middle switches of all RDSC cells in the cascade from upstream to downstream, upon individual middle switches' body diode conduction. The control circuitry can sequence switching a cascade of RDSC cells undergoing a parallel mode to series mode transition to achieve zero voltage switching by turning off a low side switch of a rectifier coupled to the cascade of RDSC cells undergoing a parallel mode to series mode transition, turning on a high side switch of a rectifier coupled to the cascade of RDSC cells undergoing a parallel mode to series mode transition, and turning on a middle switch of each RDSC cell in the cascade from upstream to downstream. The control circuitry can sequence switching a cascade of RDSC cells undergoing a series mode to parallel mode transition to achieve zero voltage switching by turning off a middle switch of a most downstream RDSC cell in the cascade of RDSC cells undergoing a series mode to parallel mode transition, turning on a bottom switch of the most downstream RDSC cell upon its body diode conduction, and then turning on a top switch of the most downstream RDSC cell, turning off a middle switch of an adjacent upstream RDSC cell, turning on a bottom switch of the adjacent upstream RDSC cell upon its body diode conduction, and then turning on a top switch of the adjacent upstream RDSC cell, and turning off a high side switch and turning on a low side switch of a rectifier corresponding to the cascade of RDSC cells undergoing a series mode to parallel mode transition. The control circuitry can sequence switching a cascade of RDSC cells undergoing a series mode to parallel mode transition to achieve zero voltage switching by simultaneously turning off a middle switch of all RDSC cells in the cascade of RDSC cells undergoing a series mode to parallel mode transition and turning off a high side switch of a rectifier corresponding to the cascade of RDSC cells, simultaneously turning on a bottom switch and a top switch of each RDSC cell in the cascade of RDSC cells undergoing a series mode to parallel mode transition, and turning on a low side switch of a rectifier corresponding to the cascade of RDSC cells undergoing a series mode to parallel mode transition. The controller circuitry can further wait for the coil current to discharge a voltage on a second terminal of each flying capacitor through an auxiliary diode of each RDSC cell after simultaneously turning off the middle switch of all RDSC cells and turning off a high switch of the rectifier, and simultaneously turning on the bottom switch and the top switch of each RDSC cell can occur upon completion of discharging the voltage on the second terminal of each flying capacitor.

The wireless power receiver can further include control circuitry that operates to communicate data to the wireless power transmitter by amplitude shift keying. The wireless power receiver can further include controllable load circuitry coupled to at least one of the output of the first rectifier and the output of the second rectifier. The control circuitry can operate the first and second cascades of one or more RDSC cells to simultaneously alternate between a first conversion ratio and a second conversion ratio. The control circuitry can operate the first and second cascades of one or more RDSC cells to respectively alternate between a first conversion ratio and a second conversion ratio, wherein the cascades of one or more RDSC cells operate at two or more conversion ratios on the same switching cycle.

A wireless power transmitter can include a first cascade of one or more inverter driver switched capacitor (IDSC) cells coupled between a DC input bus and an input of a first inverter, a second cascade of one or more IDSC cells coupled between the DC input bus and an input of a second inverter, and a wireless power transmitter coil having a first terminal coupled to an output of the first inverter and a second terminal coupled to an output of the second inverter. Each IDSC cell can include a flying capacitor having a first terminal coupled to an input of the IDSC cell and a second terminal, a top switch having a first terminal coupled to the input of the IDSC cell and the first terminal of the flying capacitor and a second terminal coupled to a first output terminal of the IDSC cell, thereby allowing the top switch to selectively couple first terminal of the flying capacitor to the first output terminal of the IDSC cell, a middle switch having a first terminal coupled to a second output terminal of the IDSC cell and a second terminal coupled to the second terminal of the flying capacitor, thereby allowing the middle switch to selectively couple the second terminal of the flying capacitor to the second output terminal of the IDSC cell, and a bottom switch having a first terminal coupled to the second terminal of the flying capacitor and the second terminal of the middle switch and a second terminal coupled to ground, thereby allowing the bottom switch to selectively couple the second terminal of the flying capacitor to ground. Each IDSC cell can further include a diode having its anode coupled to the second terminal of the flying capacitor and its cathode coupled to the wireless power transmitter coil.

The first cascade of one or more IDSC cells can further include a first upstream IDSC cell having its input terminal coupled to the DC input bus and its first output terminal coupled to the input of the first inverter and a first downstream IDSC cell having its input terminal coupled to the second output terminal of the first upstream IDSC cell and its first and second output terminals coupled to the input of the first inverter. The second cascade of one or more IDSC cells can further include a second upstream IDSC cell having its input terminal coupled to the DC input bus and its first output terminal coupled to the input of the second inverter and a second downstream IDSC cell having its input terminal coupled to the second output terminal of the second upstream IDSC cell and its first and second output terminals coupled to the input of the second inverter. The first and second cascades of IDSC cells can each further include one or more intermediate IDSC cells, with each intermediate IDSC cell having its input terminal coupled to an immediately upstream IDSC cell, its first output terminal coupled to the input of either the first or second inverter, and its second output terminal coupled to an immediately downstream IDSC cell.

The wireless power transmitter can further include control circuitry that operates the first cascade of one or more IDSC cells in a series mode to cause the first and second inverters to produce a positive half cycle and in a parallel mode to cause the first and second inverters to produce a negative half cycle and operates the second cascade of one or more IDSC cells in a series mode to cause the first and second inverters to produce a negative half cycle and in a parallel mode to cause the first and second inverters to produce a positive half cycle. The control circuitry can sequence switching of switching devices of each cascade of IDSC cells to achieve zero voltage switching.

The control circuitry can sequence switching of a cascade of IDSC cells undergoing a parallel mode to series mode transition to achieve zero voltage switching by simultaneously tuning off all top and bottom switches of the cascade of IDSC cells undergoing a parallel mode to series mode transition, tuning off a low side switch of a corresponding inverter, turning on a high side switch of a corresponding inverter, and subsequently turning on middle switches of the IDSC cells in sequence from downstream to upstream. The control circuitry can subsequently turn on middle switches of the IDSC cells upon their body diode conduction. The control circuitry can sequence switching of a cascade of IDSC cells undergoing a parallel mode to series mode transition by tuning off a low side switch of a corresponding inverter, turning on a high side switch of a corresponding inverter, and subsequently turning on middle switches of the IDSC cells in sequence from downstream to upstream. The control circuitry can sequence switching of a cascade of IDSC cells undergoing a series mode to parallel mode transition by turning off a middle switch of a most upstream IDSC cell in the cascade of IDSC cells undergoing a series mode to parallel mode transition, turning on a bottom switch of the most downstream IDSC cell upon its body diode conduction, and then turning on a top switch of the most downstream IDSC cell, turning off a middle switch of an adjacent downstream IDSC cell, turning on a bottom switch of the adjacent downstream IDSC cell upon its body diode conduction, and then turning on a top switch of the adjacent downstream IDSC cell, and turning on a low side switch of a corresponding inverter. The control circuitry can sequence switching of a cascade of IDSC cells undergoing a series mode to parallel mode transition by simultaneously turning off a middle switch of all IDSC cells in the cascade of IDSC cells undergoing a series mode to parallel mode transition and turning off a high side switch of an inverter corresponding to the cascade of IDSC cells, simultaneously turning on a bottom switch and a top switch of each IDSC cell in the cascade of RDSC cells undergoing a series mode to parallel mode transition, and turning on a low side switch of an inverter corresponding to the cascade of IDSC cells undergoing a series mode to parallel mode transition. The control circuitry can further wait for the coil current to discharge a voltage on a second terminal of each flying capacitor through an auxiliary diode of each IDSC cell after simultaneously turning off the middle switch of all IDSC cells and turning off a high switch of the inverter, and simultaneously turning on the bottom switch and the top switch of each IDSC cell can occur upon completion of discharging the voltage on the second terminal of each flying capacitor.

DETAILED DESCRIPTION

Figure 1:
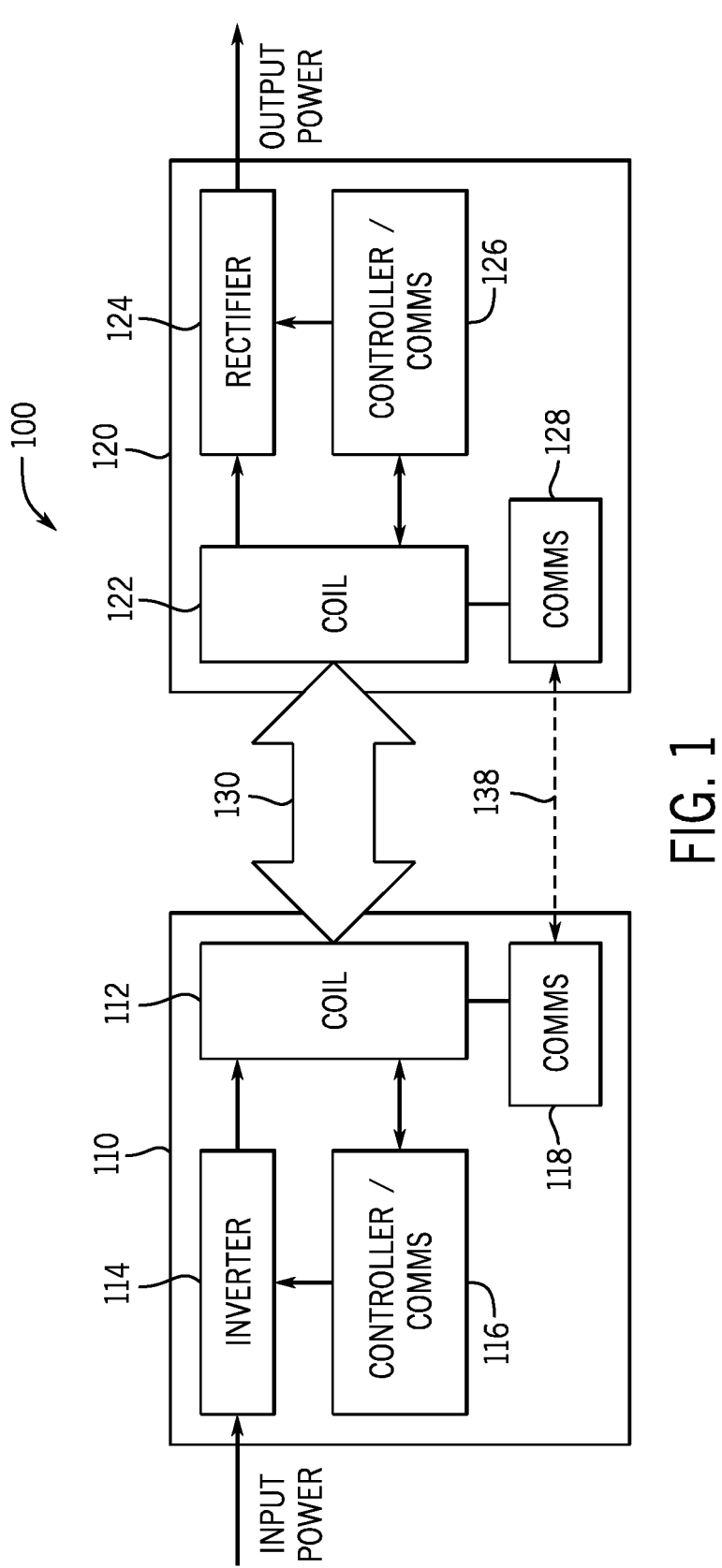
FIG. 1 illustrates a block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one." or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications ("comms") module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to provide a given output voltage depending on the particular application. In some embodiments, the controller/communications module may be configured to send information to the PTx device to effectively control the power delivered to the receiver. This information may be received or sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx.

Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
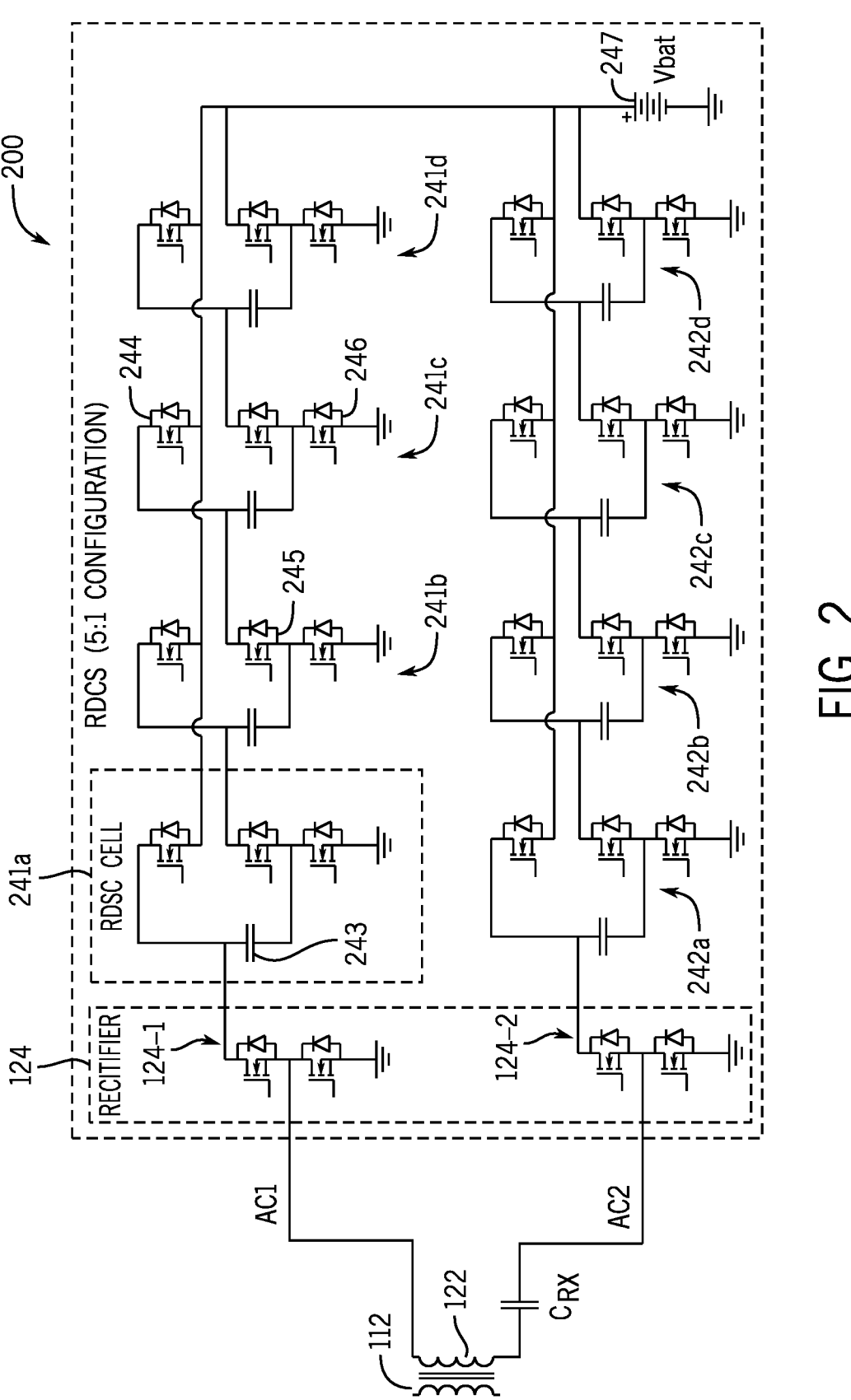
FIG. 2 illustrates a 5:1 rectifier driven switched capacitor converter system.

FIG. 2 illustrates a 5:1 rectifier driven switched capacitor ("RDSC") converter system 200. The RDSC converter is positioned on the PRx side of the wireless power transfer system, downstream of wireless power receive coil 122 and upstream of a load to be powered, e.g., a battery 247 that is to be charged by the wireless power transfer system. Thus, the RDSC can be part of an electronic device configured to receive power wirelessly to power the device and/or charge a battery of the device, such as a smart phone, smart watch, tablet computer, or accessory such as a stylus, wireless earphones, etc. In the illustrated system, the RDSC includes two rectifiers 124-1 coupled to node/terminal AC1 and 124-2 coupled to node/terminal AC2. Note that rectifier 124-2 is coupled to the wireless power receive coil by a tuning capacitor $C_{RX}$. Following each rectifier are four cascading RDSC cells. More specifically, following rectifier 124-1 are RDSC cells 241*a*, 241*b*, 241*c*, and 241*d*. Similarly, following rectifier 124-2 are RDSC cells 242*a*, 242*b*, 242*c*, and 242*d*. All cells' top switches connect to the output voltage. Additionally, the middle switch of the last cell also connects to the output voltage.

Each RDSC cell includes a flying capacitor 243, a top switch 244, and mid switch 245, and a bottom switch 246. For sake of clarity in FIG. 2, not every element of every cell is labelled, but these reference numbers correspond to such element of each RDSC cell. Operation of the cells and switching devices is described in greater detail below. As a brief operational summary, an AC current appears in coil 122 by virtue of operation of the wireless power transfer system described above. Thus, a rectified voltage appears at the inputs of the RDSC converter, which is determined by and typically an integer multiple of the output voltage. All cascaded RDSC cells operate with equal or similar flying capacitor voltages. They are firstly connected in series, stacking up to the rectified voltage, and receiving the rectified current; and then, they are connected in parallel to deliver the same amount of current to the output, effectively dividing the rectified voltage and multiplying the rectified current. An N:1 reduction in voltage, corresponding to an N:1 increase in current, requires a cascade of N−1 cells. Thus, the 5:1 configuration of FIG. 2 requires a cascade of four cells. A system employing a 2:1 configuration would require only a single cell, etc.

Figure 3:
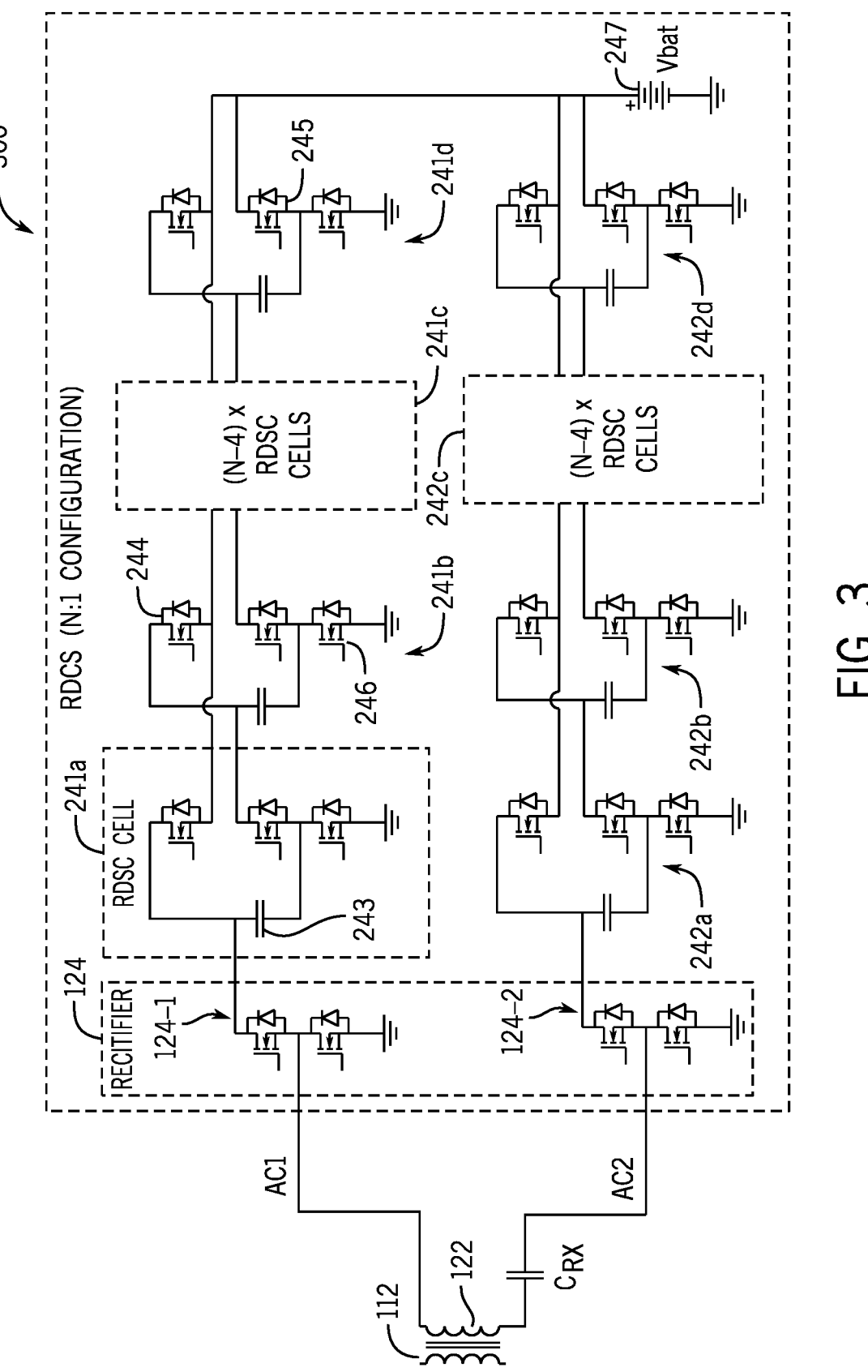
FIG. 3 illustrates an N:1 rectifier driven switched capacitor converter system.

FIG. 3 illustrates a generalized N:1 rectifier driven switched capacitor converter system 300. As noted above with respect to FIG. 2, a 5:1 the RDSC voltage conversion ratio (which is a step down ratio) and the corresponding current conversion ratio (which is a step up ratio) can be extended to N:1 by cascading N-1 RDSC cells, as shown in FIG. 3. Thus in FIG. 3, RDSC cells 241*c* and 242*c* may correspond to any number of RDSC cells, specifically N−4 RDSC cells to produce the desired N:1 conversion ratios. The N−4 is because three other RDSC cells 241*a*, 241*b*, and 241*d* are illustrated. Otherwise, the RDSC system 300 of FIG. 3 corresponds to the RDSC system 200 of FIG. 2.

Figure 4:
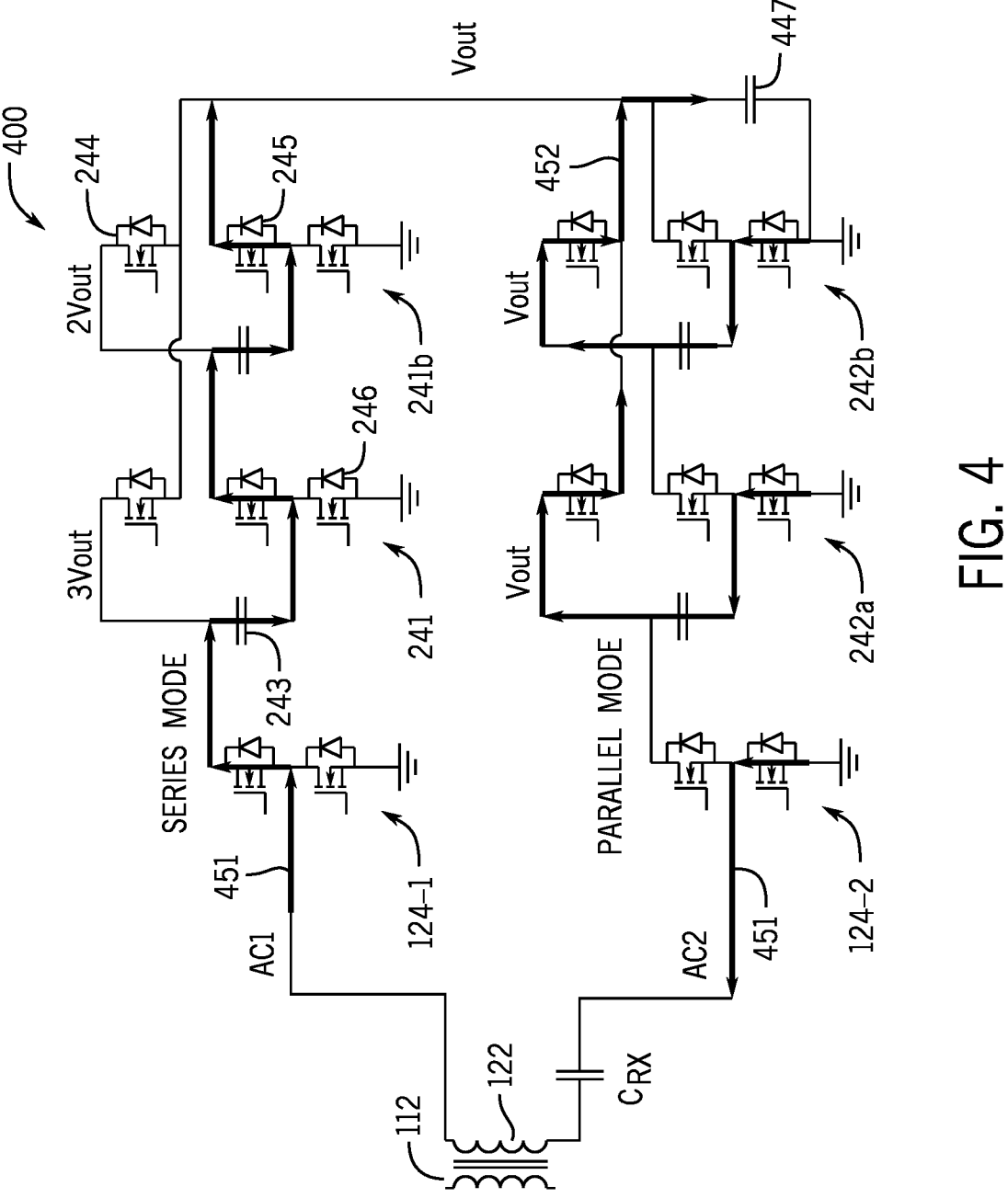
FIG. 4 illustrates basic operation rectifier driven switched capacitor converter using a 3:1 rectifier driven switched capacitor converter as an example.

FIG. 4 illustrates basic operation of an RDSC converter 300 using a 3:1 conversion ratio converter as an example. Depending on coil current direction, each cascaded RDSC branch can operate in either parallel mode or series mode. In other words, when the current induced in wireless power receive winding 122 flows from bottom to top, as illustrated in FIG. 4, the upper cascade of RSDC cells 241*a*/241*b* can operate in a series mode, while the lower cascade of RSDC cells 242*a*/242*b* operates in a parallel mode. In the series mode, the switches are controlled/operated so that current 451 flows from the wireless power receive coil 122, through the high side switch of rectifier 124-1, through the flying capacitor 243 and mid switch 245 of each of RDSC cells 241*a*/241*b* in series, through the load connected to the output bus (battery 247), returning to the wireless power receive coil 122 via the low side switch of the other rectifier (124-2). Thus, in the series mode, the flying capacitors 243 of the cascaded RDSC cells are all connected in series and in series with the load. In the parallel mode, the switches are controlled/operated so that current 452 flows from flying capacitors 243 of RDSC cells 242*a*/242*b*, through top switches 244 of RDSC cells 242*a*/242*b*, through the load (e.g., battery 247) returning to the respective flying capacitors via bottom switches 246 of RDSC cells 242*a*/242*b*. Thus, in the parallel mode, the flying capacitors 243 of the cascaded RDSC are all connected in parallel and in parallel with the load.

The two operation modes (series/parallel) alternate as the coil current direction changes. Thus, when the current through wireless power receive coil 122 reverses from the direction shown in FIG. 4, the lower cascade of RSDC cells 242*a*/242*b* operates in series mode, and the upper cascade of RSDC cells 241*a*/241*b* operates in parallel mode. Transitions between the series and parallel modes are described in greater detail below. Thus, to summarize, when wireless power receive coil current flows into a rectifier (e.g., node AC1 and rectifier 124-1 in FIG. 4), the corresponding RDSC branch (241*a*/241*b*) operates in series mode. Conversely, when wireless power receive coil current flows out of a rectifier (e.g., node AC2 and rectifier 124-2 in FIG. 4) the corresponding RDSC branch (242*a*/242*b*) operates in parallel mode.

Stated another way, in series mode, the coil current flows through the corresponding rectifier's high-side switch, so the RDSC branch current is driven by the coil current. All RDSC cells in the corresponding cascade turn on their middle switches 245 and turn off their top switches 244 and bottom switches 246. Thus, flying capacitors 243 are connected in series with the output capacitor 447, hence the name "series mode." Each flying capacitor in the series mode cascade initially has a voltage close to the converter output voltage Vout, so the cascaded voltage at the output of rectifier 124-1 is about 3×Vout. In the parallel mode, the coil current flows through the corresponding rectifier's low side switch, so the RDSC branch is effectively disconnected from the coil. All RDSC cells in the corresponding cascade turn on their top switches 244 and bottom switches 246 and turn off their middle switches 245. As a result, flying capacitors 243 are connected in parallel with the output capacitor 447, hence the name "parallel mode." Each flying capacitor discharges current into output capacitor 447, and thus have similar voltage (~Vout), but their currents sum, providing the current conversion ratio of the converter.

Figure 5:
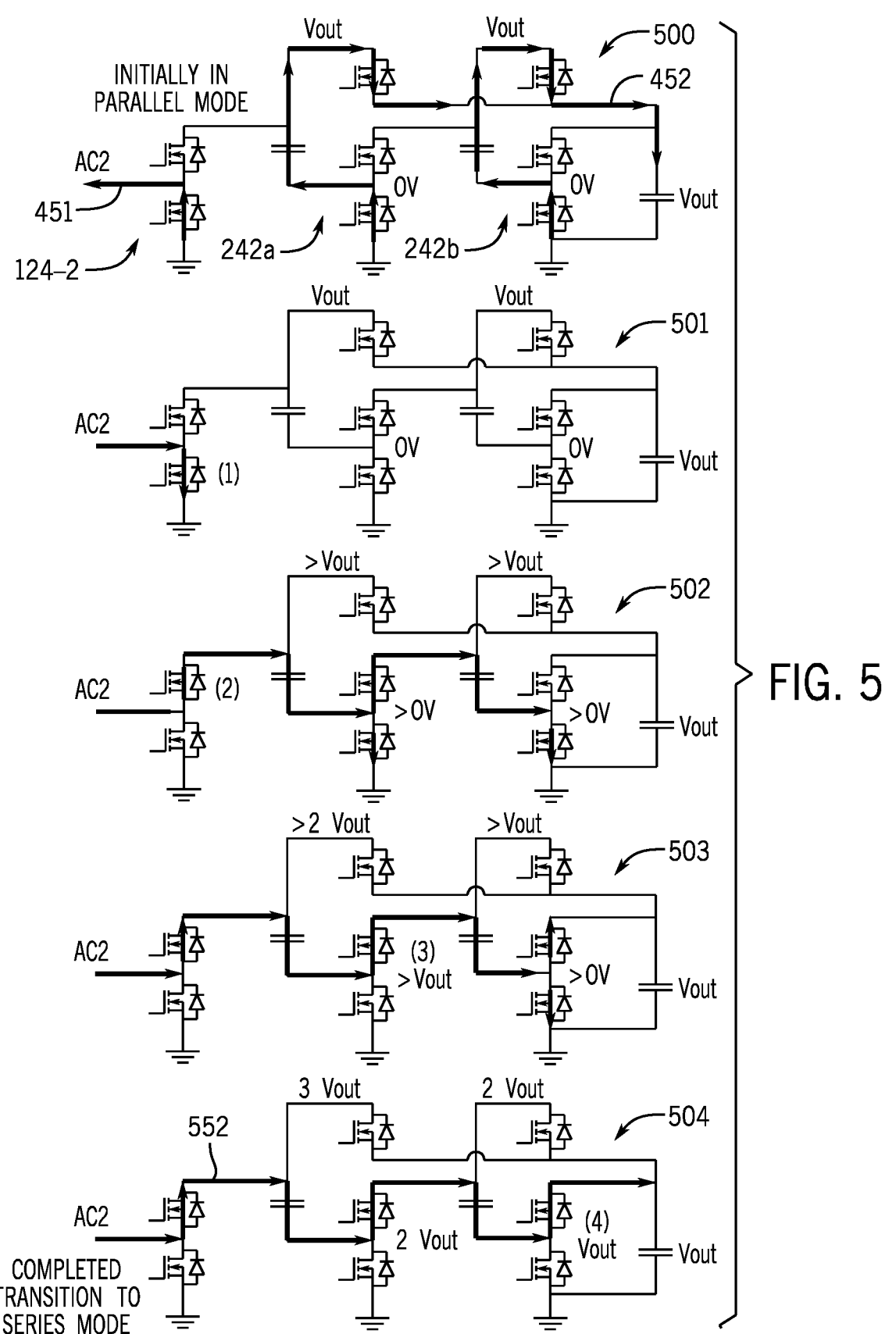
FIG. 5 illustrates a parallel mode to series mode transition for a rectifier driven switched capacitor system.

FIG. 5 illustrates a parallel mode to series mode transition for a rectifier driven switched capacitor system that provides soft switching for all switching devices. The transition is illustrated as a sequence of switching states 500-504. Initially, in switching state 500 (which is the parallel mode), the RDSC branch is in parallel mode as described above. Coil current 451 flows from ground to AC node AC2 through the low-side switch of rectifier 124-2. Switching event 1, producing switching state 501, occurs when a coil current zero crossing is detected at the low side switch of rectifier 124-2. (Note current reversal as between switching state 500/501.) At this time, high switches 244 (FIG. 2) and low switches 246 (FIG. 2) of each RDSC cell in the branch (i.e., 242a/242b) are turned off.

Switching event 2 is then the turn off of the rectifier low side switch denoted "(1)" in switching state 501. This causes the coil current to begin flowing through the intrinsic body diode of the rectifier high side switch. When the rectifier high side switch's body diode conducts, the switch can be turned on in a zero voltage switching ("ZVS") condition, denoted "(2)" in switching state 502. This allows the coil current to flow into the first RDSC cell's switch node (i.e., the connection of middle switch 245 and bottom switch 246) through the first RDSC cell's flying capacitor. A portion of the switch node current can flow through the middle switch's junction capacitance and subsequently flows into the second cell's switch node (via the second cell's flying capacitor).

Then, switching event 3 occurs, producing switching state 503 when the middle switch 245 of the first RDSC cell starts to conduct through its body diode and/or bypass diode. This allows turn on of the first cell's middle switch 245 in a ZVS condition. The two flying capacitors of the first and second RDSC cells are now in series, so the rectifier output voltage is greater than 2×Vout. More specifically, if just for the first cell's middle switch turning on, the rectifier voltage would be 2×Vout. The rectifier voltage can actually be greater than 2×Vout because the second cell's junction capacitance may already be partially charged by this point, as explained in the preceding paragraph. Additionally, all coil current flows into the second cell's switch node.

Then, switching event 4 occurs, producing switching state 504, which is the series mode. The second RDSC cell's middle switch body diode starts to conduct. This allows turn on the middle switch in a ZVS condition. The two series flying capacitors are now in series with Vout, so the rectifier output voltage is 3×Vout. All coil current 552 flows through the flying capacitors and into the output capacitor.

Figure 6:
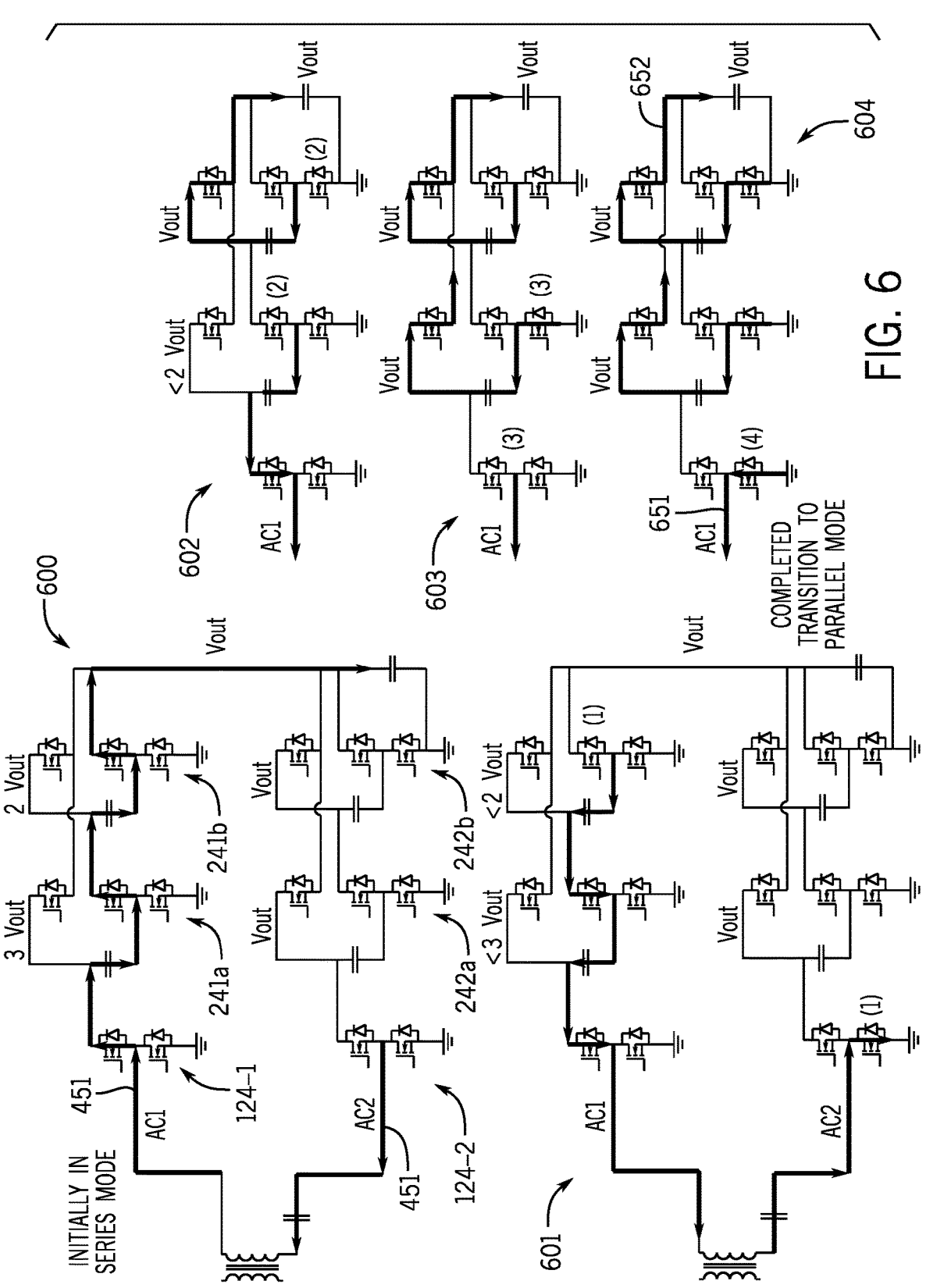
FIG. 6 illustrates a sequential series mode to parallel mode transition for a rectifier driven switched capacitor system.
Figure 7:
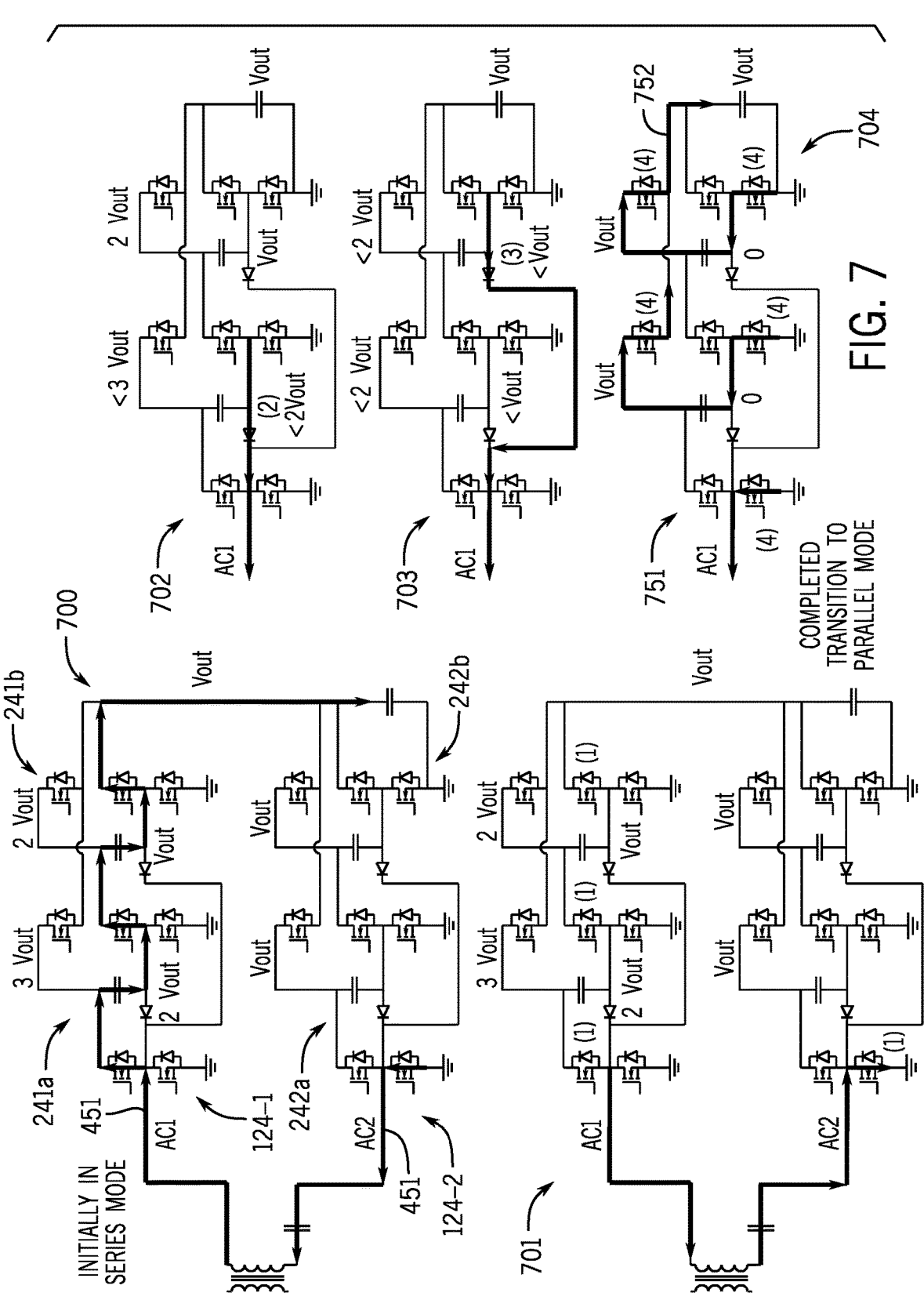
FIG. 7 illustrates a parallel series mode to parallel mode transition for a rectifier driven switched capacitor system.

There are two methods for series mode to parallel mode transition: sequential (i.e., staged/staggered/delayed) or parallel (i.e., simultaneous). FIG. 6 illustrates a staged/staggered/delayed series mode to parallel mode transition for a rectifier driven switched capacitor system. FIG. 7 illustrates a simultaneous series mode to parallel mode transition.

With reference to FIG. 6, a series mode to parallel mode transition that provides soft switching for all switching devices is illustrated by a series of switching states 600-604. The first two states 600/601 illustrate the entire RDSC converter, while the latter three states illustrate only the upper branch undergoing the series to parallel transition. Initially, in state 600, the upper RDSC branch coupled to node AC1 is in series mode. Coil current flows from ground to the AC2 node through the low side switch of rectifier 124-2. Switching event 1 occurs when a coil current zero crossing is detected, e.g., at the low side switch of rectifier 124-2. As a result, the middle switch 245 of the last RDSC cell 241b can be turned off. This event is denoted by "(1)" in switching state 601. As a result, the coil current discharges switch node of RDSC cell 242b.

Switching event 2 occurs when bottom switch 246 of the last RDSC cell 241b turns on in a ZVS condition, as illustrated by "(2)" in switching state 602. At the same time, middle switch 245 of the next upstream RDSC cell, i.e., first RDSC cell 241a turns off, also illustrated by a "(2)" in switching state 602. As a result, coil current discharges the switch node of RDSC cell 241a. If there were additional RDSC cells, then operation would proceed in this manner, with the bottom switch of a downstream RDSC cell turning on at the same time that the middle switch of the next upstream RDSC cell turns off, continuing until reaching the rectifier of the RDSC cascade.

Switching event 3 occurs when the AC1 branch first RDSC's bottom FET turns on with ZVS condition, as illustrated by (3) in switching state 603. At the same time, the high side switch of rectifier 124-1 also turns off, also illustrated by a "(3)" in switching state 603. The coil current then discharges the switch node of rectifier 124-1 (i.e., the connection of its high side and low side switches). Finally, switching event 4 occurs when the low side switch of rectifier 124-1 turns on in a ZVS condition, denoted "(4)" in switching state 604, which illustrates the completed series-to-parallel mode transition, which exhibits parallel mode current 652 for the upper RDSC cascade and series mode current 651 for the lower RDSC cascade.

FIG. 7 illustrates a simultaneous series mode to parallel mode transition for a rectifier driven switched capacitor system that provides soft switching for all switching devices in a series of switching states 700-704. The first two states 700-701 illustrate the entire RDSC converter, while the latter three states (702-704) illustrate only the upper branch undergoing the series to parallel transition. This alternative transition employs auxiliary diodes as illustrated in FIG. 7, which may be added to the circuit to facilitate this transition. Initially (switching state 700), the RDSC branch connected to node AC1 is in series mode. Coil current flows from ground to node AC2 through the low side switch of rectifier 124-2. Switching event 1 occurs when a coil current zero crossing is detected, e.g., at the low side switch of rectifier 214-2. This event can trigger the turn off the middle switch of all RDSC cells of the AC1 branch (241a/241b), denoted by "(1)" in switching state 701. Coil current discharges the switch node of rectifier 124-1 (i.e., the connection of the high side and low side switches).

Switching event 2 occurs when the voltage at node AC1 falls below 2×Vout. This allows an auxiliary diode coupled between the switch node of RDSC cell 241a and the switch node of rectifier 124-1 to begin conducting thereby discharging the switch node of the first RDSC cell 241a. This is denoted "(2)" in switching state 702. Switching event 3 occurs when the voltage of node AC1 falls below Vout. This allows an auxiliary diode coupled between the switch node of RDSC cell 241*b* and the switch node of rectifier 124-1 to begin conducting thereby discharging the switch node of the second RDSC cell 241*b*. This is denoted "(3)" in switching state 703. During this interval, both auxiliary diodes continue to discharge the respective RDSC cell switch nodes coupled to their anodes.

For a converter with more RDSC cells, operation would be similar. Once the high switch of the rectifier is turned off, the coil current will decrease the voltage appearing at the switch node of the rectifier. As this voltage decreases, auxiliary diodes coupling the switch nodes of the RDSC cells to the switch node of the rectifier will begin to conduct in sequence. The sequence begins with the RDSC cell nearest the rectifier and proceeds to the RDSC cell furthest from the rectifier. Eventually, all RDSC cell switch nodes are completely discharged at the same time. This can trigger switching event 4.

Switching event 4 occurs when all RDSC cell switch nodes are discharged. At this time, the low side switch of the rectifier turns on in a ZVS condition, indicated by "(4)" in switching state 704, which corresponds to the completed transition to parallel mode, which exhibits parallel mode current 752 for the upper RDSC cascade and series mode current 751 for the lower RDSC cascade. At the same time, bottom switches 246 of all RDSC cells (241*a*/241*b*) also turn on in a ZVS condition, also denoted "(4)" in switching state 704. Finally, the top switches 244 of all RDSC cells (241*a*/241*b*) turn on with very small drain to source voltage (Vds). This can be designed/configured to be less than about 0.6V, which is effectively a ZVS condition in practical applications.

Figure 8:
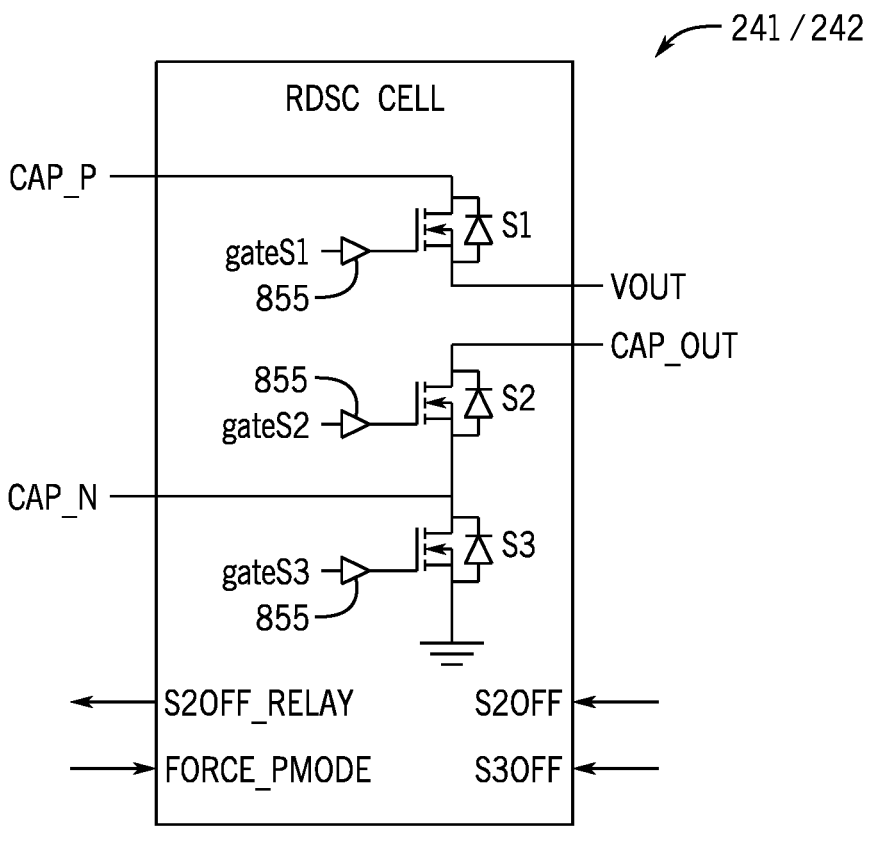
FIG. 8 illustrates a rectifier driven switched capacitor cell and signal definitions.

Described below is control circuitry that can produce the operating modes, switching states, and transitions described above. FIG. 8 illustrates a rectifier driven switched capacitor cell 241/242 with specific terminals and control signals specifically identified. As described above, each RDSC cell 241/242 includes a high switch denoted 244 in FIGS. 2-7 and S1 in FIGS. 8-12, a middle switch denoted 245 in FIGS. 2-7 and S2 in FIGS. 8-12, and a low switch denoted 246 in FIGS. 2-7 and S3 in FIGS. 8-12. Each switch has a corresponding gate drive signal gateS1, gateS2, gateS3. The gate drive signals generated by the control circuitry may be provided to gate drivers 855 that generate a suitable gate voltage for each respective switch from the corresponding gate drive signals.

Each RDSC cell also includes a flying capacitor designated 243 in other figures, but not illustrated in FIG. 8. The flying capacitor of each respective RDSC cell can be connected to terminals CAP_P and CAP_N. Terminal CAP_P can be coupled to the high side of high switch 244/S1. Terminal CAP_N can be coupled to the switch node of the RDSC cell, i.e., the connection point of the middle and low switches. Additional "power" connections of the RDSC cell, meaning the path along which power flows as opposed to the control signals discussed below, include the VOUT terminal connecting to the low side of switch high switch S1 and CAP_OUT connecting to the high side of middle switch S2. The VOUT terminal is always coupled to the output bus of the converter, e.g., to output capacitor 447 or battery 247, as described above. The CAP_OUT terminal facilitates the flying capacitor connection in Series mode, which connects to the VCAP_P terminal of the next downstream RDSC cell, or the output bus if the cell has no more downstream cells.

Also illustrated in FIG. 8 are control terminals/connections, specifically, inter-cell control connections/terminals, as described in greater detail below with respect to FIGS. 10A-11B. These include an S2OFF input and an S3OFF input, allowing RDSC cell to receive an input turning off middle switch S2 and low switch S3. Additionally, a FORCE_PMODE input may be provided, allowing RDSC cell 241/242 to receive a control signal commanding it to engage the parallel mode. Finally, the RDSC cell 241/242 can include an S2OFF_RELAY signal output, allowing the RDSC cell to pass through an S2OFF command. Each of these inter-cell control signals is explained in greater detail below with respect to FIGS. 10A-11B.

Figure 9:
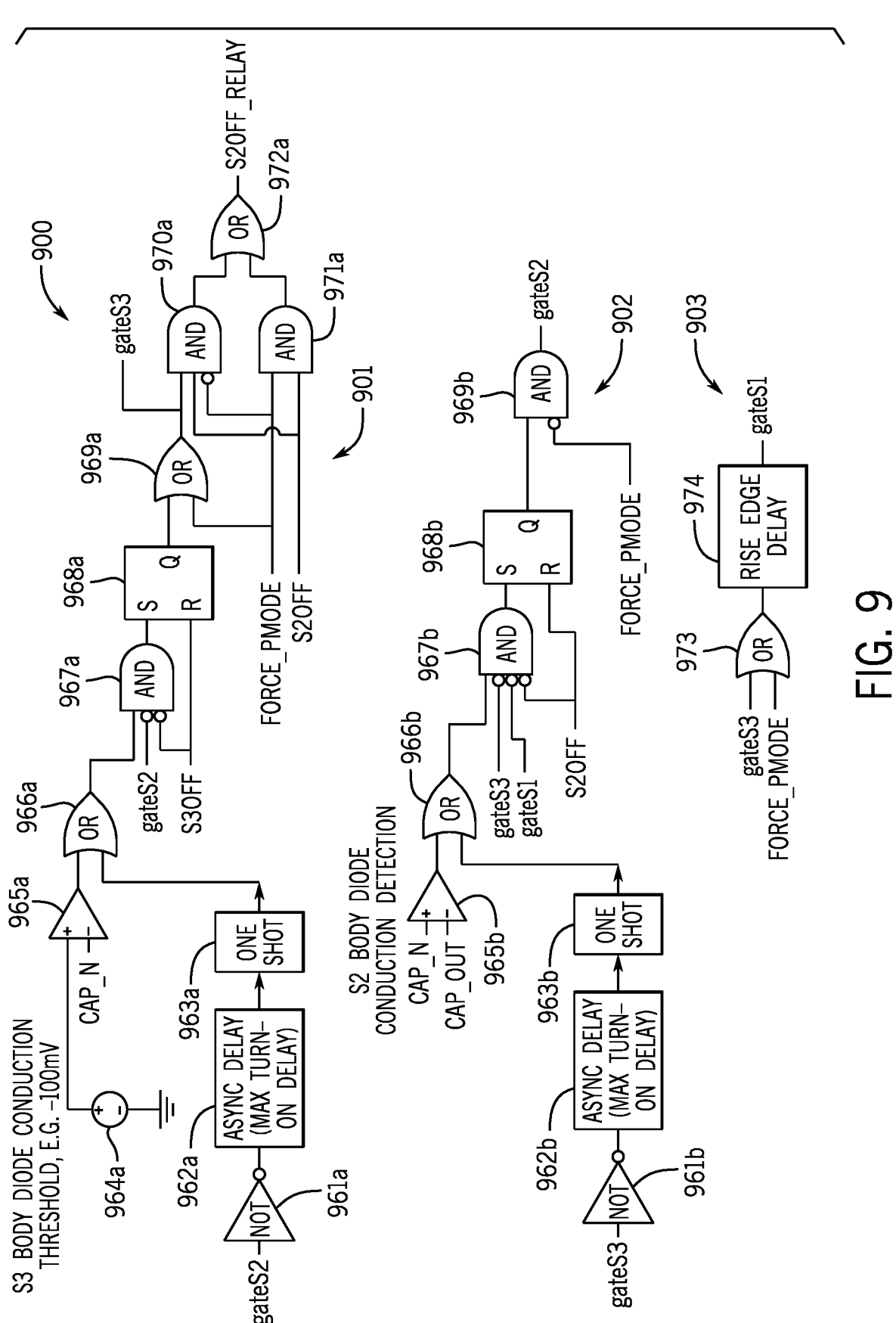
FIG. 9 illustrates internal control logic of a rectifier driven switched capacitor cell.

FIG. 9 illustrates internal control logic 900 of a rectifier driven switched capacitor cell. The control logic may be implemented in any of a variety of forms, including the use of discrete circuitry, integrated circuitry, or programmable circuitry that is programmed to perform the described functionality. The following description is based on discrete logic gates/blocks intended to provide a basic description of the elements of the control circuitry with the understanding that the functionality described could be implemented in a variety of structural forms. The high level function of each cell and the alternation between the series and parallel modes of a series of cells in a power converter can be as described above even with other cell control circuitry implementations.

Internal or intra cell control logic 900 is broken down into three trains 901, 902, and 903. The internal control logic can generate the internal gate drive signals for the switches of the RDSC cell as well as the S2OFF_RELAY signal described above. Logic train 901 generates the gateS3 signal for driving low switch S3 as well as the S2OFF_RELAY signal passed to other cells from various inputs described below. Logic train 902 generates the gateS2 signal for driving middle switch S2 from various inputs described below. Logic train 903 generates the gateS1 signal for driving high switch S1 from various inputs described below.

As noted above, logic train 903 generates the gateS1 signal for driving top switch S1 from two inputs, the gateS3 signal (produced by logic train 901) and the FORCE_PMODE signal, received from other control circuitry. This other control circuitry can be PRx control circuitry 126, which operates the RDSC cells as described with reference to FIGS. 2-7, i.e., alternating between series and parallel mode with the cycling of receive coil current employing the various transitions described above. More specifically, the two input signals of logic train 903 are provided as an input to OR gate 973. If either signal is a logic high, then a logic high will be provided to rising edge delay 974, which generates gateS1. Thus, gateS1 will be high, corresponding to a turn on of high switch S1, shortly after either gateS3 (corresponding to the low switch of the cell) or FORCE_PMODE (corresponding to the cell being forced to parallel mode) transitions high. Thus, high switch S1 is turned on with switch S3 or by an external FORCE_PMODE signal, as described above.

Logic train 902 generates the gateS2 signal for driving middle switch S2 from several inputs including the gateS3 signal (provided to inverter/NOT gate 961*b* and an inverting input of AND gate 967*b*), the voltages at the CAP_N and CAP_OUT terminals (provided to comparator 965*b*), the gateS1 drive signal (also provided to an inverting input of AND gate 967*b*). Additional inputs to logic train 902 include the S2OFF signal received from an adjacent RDSC cell as described in greater detail below with respect to FIGS. 10A-11B, which is provided to an inverting input of AND gate 967*b* and the reset ("R") input of flipflop 968*b*, and the FORCE_PMODE signal received from other control circuitry as described above, which is provided to the reset input of flip flop 968b and an inverting input of AND gate 969b.

Operation of logic train 902 is as follows. The gateS3 drive signal is provided to an input of logical inverter/NOT gate 961b. The inverted gate drive signal is thus provided to asynchronous delay block 962b, which provides a maximum turn-on delay. The output of delay circuit 962b passes to a one shot 963b, that provides a logic high pulse when triggered that is delivered to OR gate 966b. The other input of OR gate 966b is the output of a comparator 965b that compares the voltage at the CAP_N terminal (FIG. 8) to the CAP_OUT terminal (FIG. 8) to detect body diode conduction of switch S2. Thus, OR gate 966b will receive a positive input and therefore produce a positive output when either the body diode of middle switch S2 is conducting or after a maximum delay (block 962b) after low switch S3 has turned off. The output signal of OR gate 966b may thus be thought of as a "raw" turn-on signal for switch S2, meaning that it will cause the switch S2 drive signal gateS2 to transition high unless inhibited by the remaining circuitry of logic train 902 described below.

The remainder of logic train 902 implements circuitry responsive to conditions that should prevent the turn on of switch S2. Recall from above that the turn on of switch S2 corresponds to exiting the parallel mode and entering the series mode, while the turn off of switch S2 corresponds to exiting the series mode and entering the parallel mode as described in greater detail above. In any case, the above-described "raw" turn on signal for switch S2 that is the output of OR gate 966b is provided to a non-inverting input of AND gate 967b. The remaining three inputs of AND gate 967b are inverting and receive the gateS1 and gateS3 drive signals and the S2OFF signal. Thus, the output of AND gate 967b will be high if the "raw" switch S2 turn on signal is high, both the gateS1 and gateS3 drive signals for switches S1 and S2, respectively, are both low, and switch S2 is not being forced off by the S2OFF signal. In other words, switch S2 cannot be turned on if either switch S1 or switch S3 is already on or if it is otherwise being forced off. The output of AND gate 967b is provided to the set ("S") input of S-R flipflop 968b. The reset ("R") input of flipflop 968b receives the S2OFF signal from an adjacent RDSC cell as described in greater detail below. Thus, switch S2 will be turned off if the S2OFF signal from an adjacent RDSC cell is received. Finally, the output ("Q") of flipflop 968b is provided to a first input of AND gate 969b, which receives at its other (inverting) input the FORCE_PMODE signal from an adjacent RDSC cell as described in greater detail below. The output of AND gate 969b is the gateS2 drive signal for middle switch S2. Thus, if the output of AND gate 969b will be high if triggered by flipflop 968b and the cell is not being forced into parallel mode.

To summarize the above, switch S2 will be turned on by a logical high gateS2 drive signal that is generated in response to either body diode conduction by switch S2 (i.e., a ZVS condition) or after a predetermined delay from the turn off of switch S3, provided that neither switch S1 nor S2 is on and there has been no S2OFF signal or FORCE_PMODE signal received from an adjacent RDSC cell.

Logic train 901 generates the gateS3 signal for driving low switch S3 as well as the S2OFF_RELAY signal passed to other cells. Logic train 901 generates the gateS3 signal for driving low switch S3 from several inputs including the gateS2 signal (provided to inverter/NOT gate 961a and an inverting input of AND gate 967a) and the voltage at the CAP_N terminal and a reference voltage for switch S3 body diode conduction (provided to comparator 965a). Additional inputs to logic train 901 include the S2OFF and S3OFF signals received from an adjacent RDSC cell as described in greater detail below and the FORCE_PMODE signal received from other control circuitry as described above. The S3OFF signal is provided to an inverting input of AND gate 967A, and the FORCES_PMODE and S2OFF signals are provided to the inputs of an AND gate 971a.

Operation of logic train 901 is as follows. The gateS2 drive signal is provided to an input of logical inverter/NOT gate 961a. The inverted gate drive signal is thus provided to asynchronous delay block 962a, which provides a maximum turn-on delay. The output of delay circuit 962a passes to a one shot 963a, that provides a logic high pulse when triggered to OR gate 966a. The other input of OR gate 966a is the output of a comparator 965a that compares the voltage at the CAP_N terminal (FIG. 8) to a reference voltage 964a to detect body diode conduction of switch S3. Thus, OR gate 966a will receive a positive input and therefore produce a positive output when either the body diode of low switch S3 is conducting or after a maximum delay (block 962a) after middle switch S2 has turned off. The output signal of OR gate 966a may thus be thought of as a "raw" turn-on signal for switch S3, meaning that it will cause the switch S3 drive signal gateS3 to transition high unless inhibited by the remaining circuitry of logic train 901 described below.

Recall from above that the turn on of switch S3 corresponds to entering the parallel mode and exiting the series mode, while the turn off of switch S3 corresponds to entering the series mode and exiting the parallel mode as described in greater detail above. In any case, the above-described "raw" turn on signal for switch S3 that is the output of OR gate 966a is provided to a non-inverting input of AND gate 967a. The remaining two inputs of AND gate 967a are inverting and receive the gateS2 drive signal and the S3OFF control signal received from an adjacent RDSC cell as described in greater detail below. Thus, the output of AND gate 967a will be high if the "raw" switch S3 turn on signal is high and the gateS2 drive signal for switch S2 is low and the S3OFF signal is also low. In other words, switch S3 cannot be turned on if either switch S2 is on or an S3OFF inhibit signal has been received from an adjacent RDSC cell. The output of AND gate 967a is provided to the set ("S") input of S-R flipflop 968a. The reset ("R") input of flipflop 968a receives the S3OFF signal from an adjacent RDSC cell as described in greater detail below. Thus, switch S3 will be turned off if the S3OFF signal from an adjacent RDSC cell is received. The output ("Q") of flipflop 968a is provided to a first input of OR gate 969a, which receives at its other (inverting) input the FORCE_PMODE signal from an adjacent RDSC cell as described in greater detail below. The output of OR gate 969a is the gateS3 drive signal for low switch S3. Thus, the output of OR gate 969a will be high if triggered by flipflop 968a or if the cell is being forced into parallel mode.

To summarize the above, switch S3 will be turned on by a logical high gateS3 drive signal that is generated in response to either body diode conduction by switch S3 (i.e., a ZVS condition) or after a predetermined delay from the turn off of switch S2, provided that switch S2 is not on and switch S3 is not being forced off. Alternatively, switch S3 will be turned on if the cell is being forced into parallel mode by a FORCE_PMODE signal received from an upstream RDSC controller.

Logic train 901 also includes additional circuitry for generating the S2OFF_RELAY signal that can be provided to an adjacent RDSC cell. The gateS3 signal described above is provided to a first AND gate 970a. The FOR-CE_PMODE signal received from other control circuitry is provided to another (inverting) input of AND gate 970a. Additionally, the S2OFF signal is provided to an input of AND gate 970a. Thus, the output of AND gate 970a will be high if the gateS3 drive signal is high (i.e., switch S3 is turned on), switch S2 is forced off, and the cell is not being forced into parallel mode. Additionally, the FOR-CE_PMODE signal is provided to a first input of AND gate 971a, with the S2OFF signal received from an adjacent RDSC cell being provided to the other input. Thus, the output of AND gate 971a will be high if switch S2 is off and the cell is being forced into parallel mode. The outputs of AND gates 970a and 970b are provided to an OR gate 972a that generates the output S2OFF_RELAY signal that can be passed to adjacent RDSC cells as described in greater detail below. As a result, the S2OFF_RELAY signal will be high either if the gateS3 drive signal is high (i.e., switch S3 is turned on) and the cell is not being forced into parallel mode (AND gate 970a) or if switch S2 is off and the cell is being forced into parallel mode.

Figure 10A:
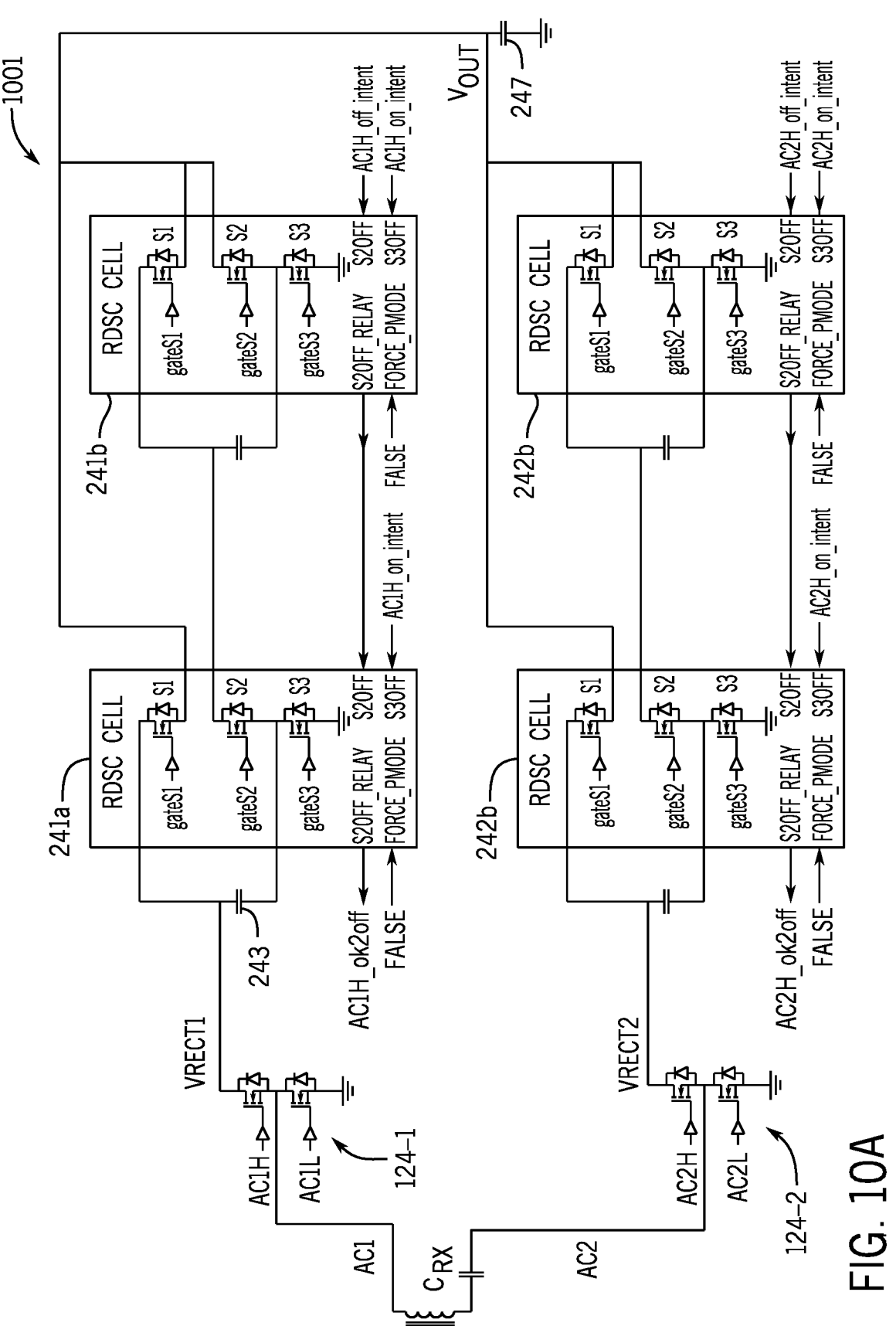
FIGS. 10A-10B illustrate inter-cell control logic for a rectifier driven switched capacitor system employing a sequential series mode to parallel mode transition.
Figure 10B:
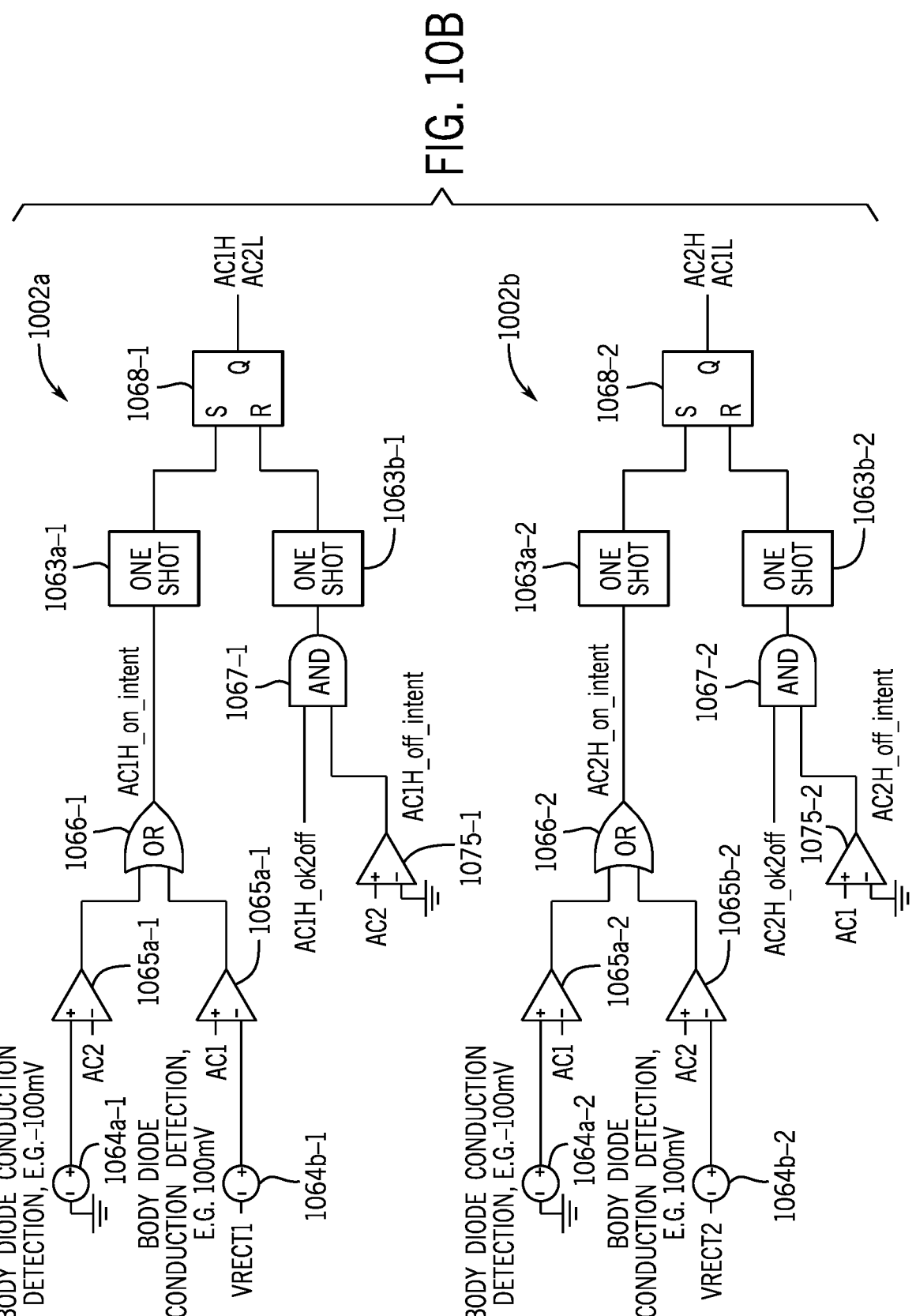

FIGS. 10A-10B illustrate inter-cell control logic 1001, 1002a, 1002b for a rectifier driven switched capacitor system employing a sequential series mode to parallel mode transition. A two-cell cascaded RDSC configuration (i.e., 3:1 conversion ratio) is used as an example, although more cells can be cascaded as described above with respect to FIG. 3. One aspect of the controller configuration of FIG. 10A is the connection of the S2OFF and S2OFF_RELAY of adjacent cells, i.e., the S2OFF_RELAY output of RDSC cell 241b is connected to the S2OFF input of RDSC cell 241a and the S2OFF_RELAY output of RDSC cell 241b is connected to the S2OFF input of RDSC cell 241a. Also illustrated in FIG. 10A are the AC1H, AC1L, AC2H, and AC2L drive signals for the high and low side switches of rectifiers 124-1 and 124-2, respectively. FIG. 10A further illustrates the external control signals for RDSC cell 241b including the AC1H_off_intent signal coupled to the S2OFF input, the AC1H_on_intent signal coupled to the S3OFF input, and a logical "FALSE" signal supplied to the FORCE_PMODE input. Similarly, the external control signals for RDSC cell 241a include the AC1H_on_intent signal coupled to the S3OFF input and a logical "FALSE" signal supplied to the FORCE_PMODE input. The S2OFF_RELAY output of RDSC cell 241a is an AC1H_ok2off signal. FIG. 10A further illustrates the external control signals for RDSC cell 242b including the AC1L_off_intent signal coupled to the S2OFF input, the AC1L_on_intent signal coupled to the S3OFF input, and a logical "FALSE" signal supplied to the FORCE_PMODE input. Similarly, the external control signals for RDSC cell 242a include the AC1L_on_intent signal coupled to the S3OFF input and a logical "FALSE" signal supplied to the FORCE_PMODE input. The S2OFF_RELAY output of RDSC cell 242a is an AC1H_ok2off signal. Each of these signals is described in greater detail below with respect to FIG. 10B.

FIG. 10B illustrates an upper logic train 1002a and a lower logic train 1002b. Upper logic train 1002a takes as inputs the AC input voltages from nodes AC1 and AC2 (to detect high side or low side body diode conduction, respectively) and the AC1H_ok2off signal coming from the most upstream high side RDSC cell 142a. Upper logic train 1002a generates as outputs the AC1H and AC2L rectifier drive signals, along with the AC1H_on_intent and AC1H_off_intent signals provided to upper RDSC cells 241a/241b as described above. More specifically, the voltage at node AC2 is provided to the inverting input of comparator 1065a-1. A body diode conduction detection reference voltage 1064a-1 is supplied to the non-inverting input of the same comparator. Thus, the output of comparator 1065a-1 will effectively be low when AC2 is positive (i.e., the higher voltage node of the AC input waveform) and high when AC2 is negative (i.e., the lower voltage node of the AC input voltage waveform). Similarly, the voltage at node AC1 is provided to the inverting input of comparator 1065b-1. A body diode conduction detection reference voltage 1064b-1 added to the output voltage VRECT1 of rectifier 124-1 is supplied to the non-inverting input of the same comparator. Thus, the output of comparator 1065b-1 will effectively be low when the output voltage VRECT1 of rectifier 124-1 is greater than the voltage at node AC1 and vice-versa. The outputs of comparators 1065a-1 and 1065b-1 are provided as inputs to OR gate 1066-1, which will generate a high output when either comparator output is high. In other words, the output of OR gate 1066-1, which is the ACH_on_intent signal, will be high during the positive cycle of the AC waveform impressed between terminals AC1 and AC2. This signal is provided to the S3OFF inputs of upper RDSC cells 241a and 241b, which triggers the turn off of bottom switches S3, and eventually, leading to the turn on of middle switches S2 in the respective RDSC cells as described above.

The AC1H_on_intent signal output from OR gate 1066-1 is also provided to one shot 1063a-1, which provides a logic high pulse on transition of AC1H_on_intent to a high logic state. The output of one shot 1063a-1 is provided to the set ("S") input of SR flipflop 1068-1, which will cause the output ("Q") of the flipflop to transition high, which provides the AC1H and AC2L output signals used to turn on the high side switch of rectifier 124-1 and low side switch of rectifier 124-2. The reset ("R") input of flipflop 1068-1 (which ultimately turns off the high side switch of rectifier 124-1 and low side switch of rectifier 124-2) is driven by the AC1H_ok2off signal, which is output from the S2OFF_RELAY output of first RDSC cell 241a in the high side cascade. This signal is provided to one input of AND gate 1067-1. The other input of AND gate 1067-1 is the output of comparator 1075-1, which has the voltage at node AC2 coupled to its non-inverting input and ground at its inverting input. Thus, the output of comparator 1075-1, which is also the AC1H_off_intent signal, is positive when the AC2 node is higher than 0V, meaning the coil current is flowing from node AC1 to node AC2. The AC1H_off_intent signal is also provided to the S3OFF input of RDSC cell 241b at the end of the cascade and begins the sequence of turning off the middle switches of the high side RDSC cascade. Thus, the output of AND gate 1067-1 is high when the input AC voltage is positive and the first RDSC cell in the high side cascade has turned off its middle switch S2 and turned on its bottom switch S3. The output of the AND gate 1067-1 is provided to one shot 1063b-1, which provides a logic high pulse whenever the output of AND gate 1067-1 goes high, triggering the reset ("R") input of flipflop 1068-1, which resets the flip flop, sending rectifier drive signals AC1H and AC2L low, turning off the high side switch of rectifier 124-1 and turning off the low side switch of rectifier 124-2.

Lower logic train 1002b takes as inputs the AC input voltages from nodes AC1 and AC2 (effectively indicating the instantaneous AC polarity of the input AC waveform) and the AC2H_ok2off signal coming from the most upstream low side RDSC cell 142b. Lower logic train 1002b generates as outputs the AC2H and AC1L inverter drive signals, along with the AC2H_on_intent and AC2H_off_intent signals provided to lower RDSC cells 242a/242b as described above. More specifically, the voltage at node AC1 is provided to the inverting input of comparator 1065a-2. A body diode conduction detection reference voltage 1064a-2 is supplied to the non-inverting input of the same comparator. Thus, the output of comparator 1065a-2 will effectively be low when AC1 is positive (i.e., the higher voltage node of the AC input waveform) and high when AC1 is negative (i.e., the lower voltage node of the AC input voltage waveform). Similarly, the voltage at node AC2 is provided to the inverting input of comparator 1065b-2. A body diode conduction detection reference voltage 1064b-2 added to the output voltage VRECT2 of rectifier 124-2 is supplied to the non-inverting input of the same comparator. Thus, the output of comparator 1065b-2 will effectively be low when the output voltage VRECT2 of rectifier 124-2 is greater than the voltage at node AC2 and vice-versa. The outputs of comparators 1065a-2 and 1065b-2 are provided as inputs to OR gate 1066-2, which will generate a high output when either comparator output is high. In other words, the output of OR gate 1066-2, which is the AC2H_on_intent signal, will be high during the negative cycle of the AC waveform impressed between terminals AC1 and AC2. This signal is provided to the S3OFF inputs of low side RDSC cells 242a and 242b, which triggers the turn off of bottom switches S3 and triggers the turn on of middle switches S2 in the respective RDSC cells as described above.

The AC2H_on_intent signal output from OR gate 1066-2 is also provided to one shot 1063a-2, which provides a logic high pulse on transition of AC2H_on_intent to a high logic state. The output of one shot 1063a-2 is provided to the set ("S") input of SR flipflop 1068-2, which will cause the output ("Q") of the flipflop to transition high, which provides the AC2H and AC1L output signals used to turn on the high side switch of rectifier 124-2 and low side switch of rectifier 124-1. The reset ("R") input of flipflop 1068-2 (which ultimately turns off the high side switch of rectifier 124-2 and low side switch of rectifier 124-1) is driven by the AC2H_ok2off signal, which is output from the S2OFF_RELAY output of first RDSC cell 242a in the low side cascade. This signal is provided to one input of AND gate 1067-2. The other input of AND gate 1067-2 is the output of comparator 1075-2, which has the voltage at node AC1 coupled to its non-inverting input and ground at its inverting input. Thus, the output of comparator 1075-2, which is also the AC2H_off_intent signal, is positive when the AC1 node is higher than 0V, meaning coil current is flowing from AC2 to AC1. The AC2H_off_intent signal is also provided to the S3OFF input of RDSC cell 242b at the end of the cascade and begins the sequence of turning off the middle switches of the low side RDSC cascade. Thus, the output of AND gate 1067-2 is high when the input AC voltage is positive and the first RDSC cell in the low side cascade has turned off its middle switch S2 and turned on its bottom switch S3. The output of the AND gate 1067-2 is provided to one shot 1063b-2, which provides a logic high pulse whenever the output of AND gate 1067-2 goes high, triggering the reset ("R") input of flipflop 1068-2, which resets the flip flop, sending rectifier drive signals AC2H and AC1L low, turning off the high side switch of rectifier 124-2 and turning off the low side switch of rectifier 124-1.

Figure 11A:
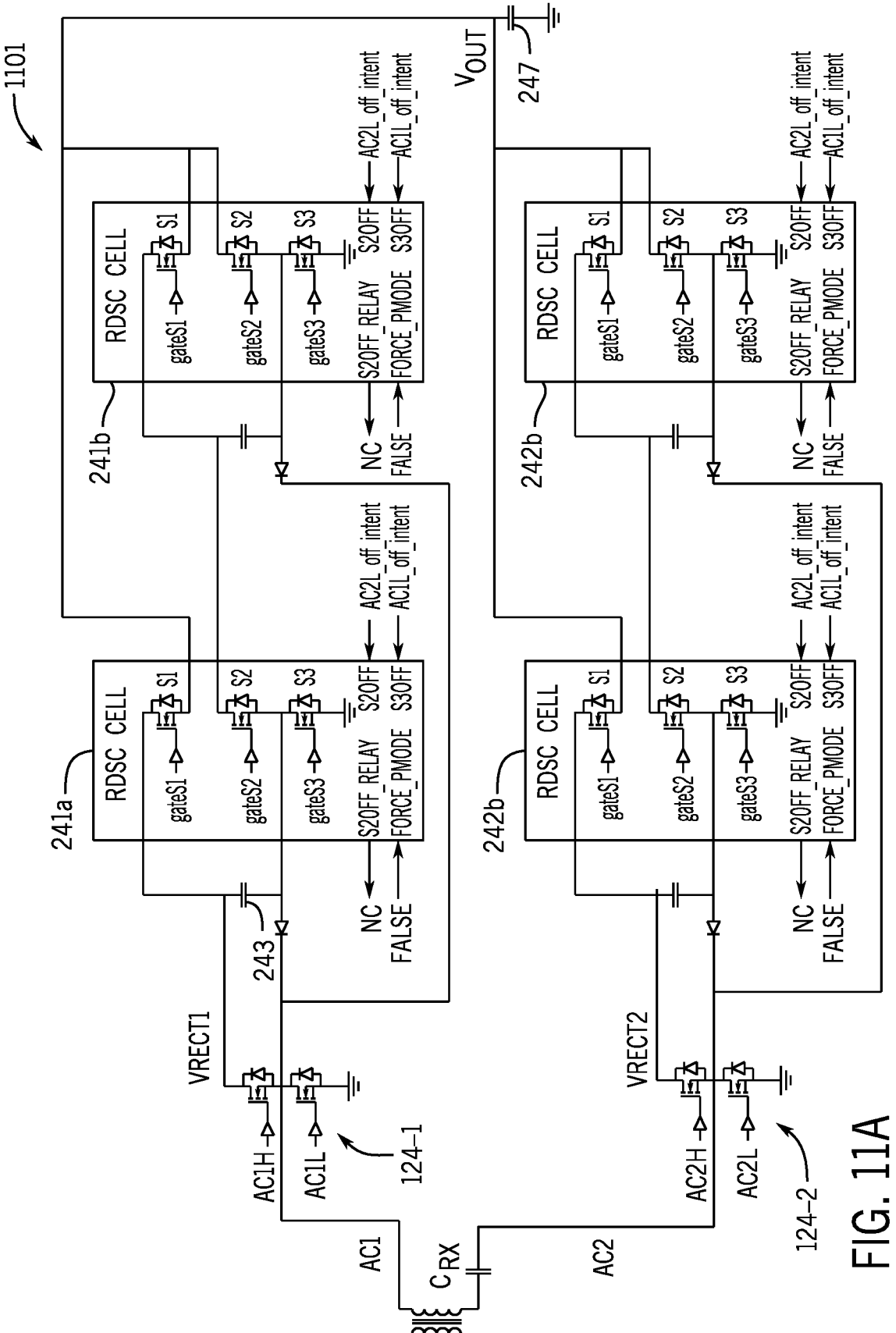
FIGS. 11A-11B illustrate inter-cell control logic for a rectifier driven switched capacitor system employing a parallel series mode to parallel mode transition.
Figure 11B:
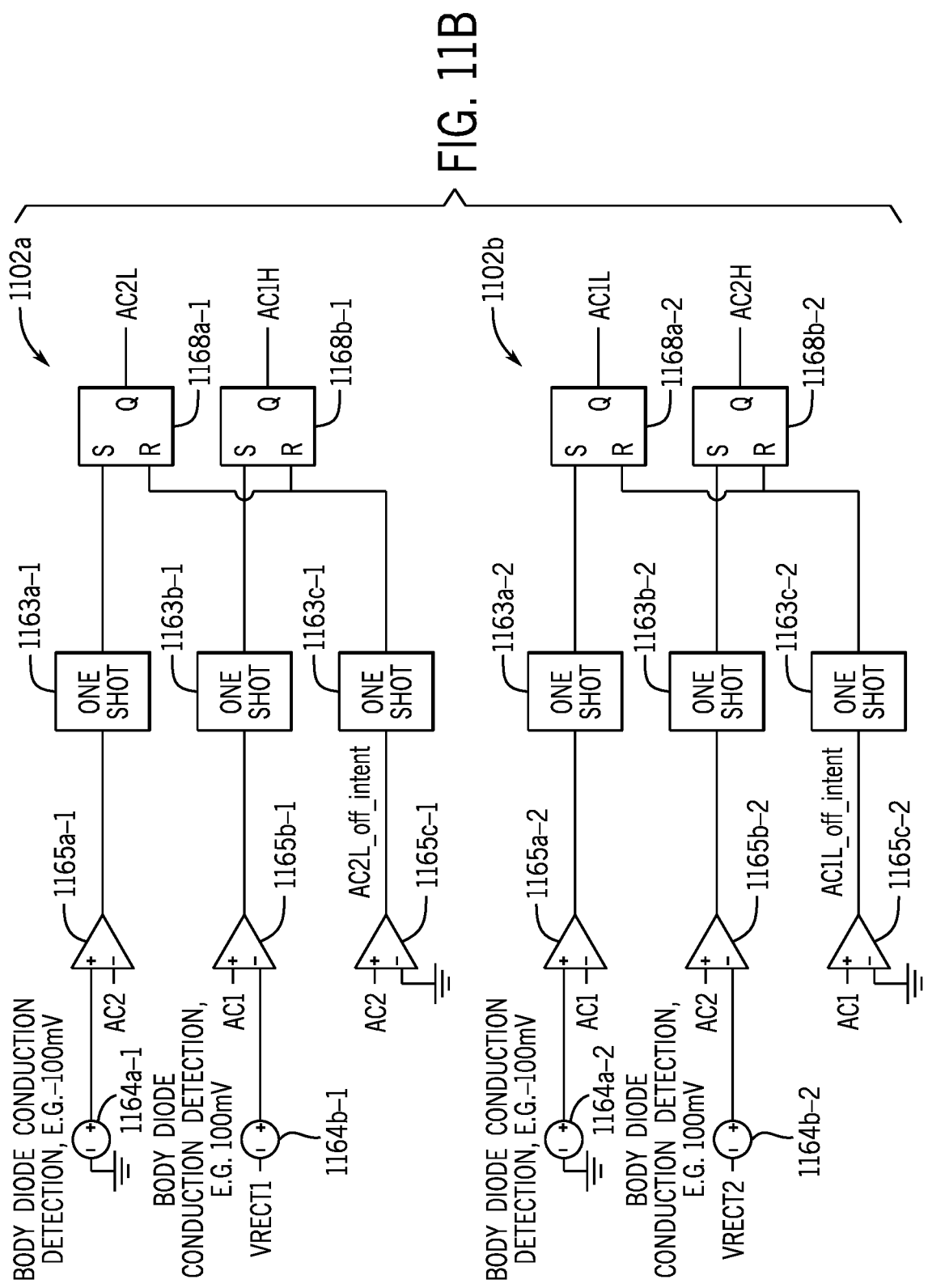

FIGS. 11A-11B illustrate inter-cell control logic 1101, 1102a, 1102b for a rectifier driven switched capacitor system employing a parallel series mode to parallel mode transition. A two-cell cascaded RDSC configuration (i.e., 3:1 conversion ratio) is used as an example, although more cells can be cascaded as described above with respect to FIG. 3. One aspect of the controller configuration of FIG. 11A that differs from above is the lack of connection ("NC") of the S2OFF_RELAY output of each RDSC cell to an adjacent cell. Also illustrated in FIG. 11A are the ACH, AC1L, AC2H, and AC2L drive signals for the high and low side switches of rectifiers 124-1 and 124-2, respectively. FIG. 11A further illustrates the external control signals for AC1 side RDSC cells 241a and 241b including the AC2L_off_intent signal coupled to the S2OFF input, the AC1L_off_intent signal coupled to the S3OFF input, and a logical "FALSE" signal supplied to the FORCE_PMODE input. FIG. 11A further illustrates the external control signals for AC2 side RDSC cells 242a and 242b including the AC1L_off_intent signal coupled to the S2OFF input, the AC2L_off_intent signal coupled to the S3OFF input, and a logical "FALSE" signal supplied to the FORCE_PMODE input. Each of these signals is described in greater detail below with respect to FIG. 11B.

FIG. 11B illustrates an upper logic train 1102a and a lower logic train 1102b. Upper logic train 1002a takes as inputs the AC input voltages from nodes AC1 and AC2. Upper logic train 1102a generates as outputs the AC1H and AC2L rectifier drive signals, along with the AC2L_off_intent signal provided to the S2OFF input of upper RDSC cells 241a/241b and the S3OFF inputs of lower RDSC cells 242a/242b as described above. More specifically, the voltage at node AC2 is provided to the inverting input of comparator 1165a-1. A body diode conduction detection reference voltage 1164a-1 is supplied to the non-inverting input of the same comparator. Thus, the output of comparator 1165a-1 will effectively be low when AC2 is positive (i.e., current flows from AC1 to AC2) and high when AC2 is negative (i.e., current flows from AC2 to AC1 and thus conducting the body diode of AC2L switch 124-2). Similarly, the voltage at node AC1 is provided to the non-inverting input of comparator 1165b-1. A body diode conduction detection reference voltage 1164b-1 added to the output voltage VRECT1 of rectifier 124-1 is supplied to the inverting input of the same comparator. Thus, the output of comparator 1165b-1 will effectively be low when the output voltage VRECT1 of rectifier 124-1 is greater than the voltage at node AC1 (body diode of AC1H is not conducting) and vice-versa (body diode of AC1H is conducting).

The outputs of comparators 1165a-1 and 1165b-1 are respectively provided as inputs to one shots 1163a-1 and 1163b-1, which provide a logic high pulse upon the respective comparator output transitioning high. These logic high pulses are respectively provided to the set ("S") inputs of SR flipflops 1168a-1 and 1168b-1. The outputs ("Q") of one shots 1168a-1 and 1168b-1 provide the AC2L drive signal for the low side switch of rectifier 124-2 and the AC1H drive signal for the high side switch of rectifier 124-1, respectively. The voltage at node AC2 is also provided to the non-inverting input of comparator 1165c-1, which has its inverting input coupled to ground. The output of comparator 1165c-1 will thus be high when AC2 is positive and low when AC2 is negative. This output is also the AC2L_off_intent signal described above. This signal is provided to the input of one shot 1163c-1, which generates a logic high pulse responsive to the AC2L_off_intent signal transitioning high. This logic pulse is provided to the reset ("R") inputs of flipflops 1168a-1 and 1168b-1, which resets the flipflops, effectively turning off the low side switch of rectifier 124-2 and the high side switch of rectifier 124-1.

Lower logic train 1102b takes as inputs the AC input voltages from nodes AC1 and AC2. Lower logic train 1102b generates as outputs the AC1L and AC2H rectifier drive signals, along with the AC1L_off_intent signal provided to the S3OFF input of upper RDSC cells 241a/241b and the S2OFF inputs of lower RDSC cells 242a/242b as described above. More specifically, the voltage at node AC1 is provided to the inverting input of comparator 1165a-2. A body diode conduction detection reference voltage 1164a-2 is supplied to the non-inverting input of the same comparator. Thus, the output of comparator 1165a-2 will effectively be low when AC1 is positive (i.e., coil current flows from AC2 to AC1) and high when AC1 is negative (i.e., coil current flows from AC1 to AC2 and conducts body diode of AC1L). Similarly, the voltage at node AC2 is provided to the non-inverting input of comparator 1165b-2. A body diode conduction detection reference voltage 1164b-2 added to the output voltage VRECT2 of rectifier 124-2 is supplied to the inverting input of the same comparator. Thus, the output of comparator 1165b-2 will effectively be low when the output voltage VRECT2 of rectifier 124-2 is greater than the voltage at node AC2 (AC2H body diode is not conducting) and vice-versa (AC2H body diode is conducting).

The outputs of comparators 1165a-2 and 1165b-2 are respectively provided as inputs to one shots 1163a-2 and 1163b-2, which provide a logic high pulse upon the respective comparator output transitioning high. These logic high pulses are respectively provided to the set ("S") inputs of SR flipflops 1168a-2 and 1168b-2. The outputs ("Q") of one shots 1168a-2 and 1168b-2 provide the AC1L drive signal for the low side switch of rectifier 124-1 and the AC2H drive signal for the high side switch of rectifier 124-2, respectively. The voltage at node AC1 is also provided to the non-inverting input of comparator 1165c-2, which has its inverting input coupled to ground. The output of comparator 1165c-2 will thus be high when AC1 is positive (coil current flows from AC2 to AC1) and low when AC1 is negative. This output is also the AC1L_off_intent signal described above. This signal is provided to the input of one shot 1163c-2, which generates a logic high pulse responsive to the AC1L_off_intent signal transitioning high. This logic pulse is provided to the reset ("R") inputs of flipflops 1168a-2 and 1168b-2, which resets the flipflops, effectively turning off the low side switch of rectifier 124-1 and the high side switch of rectifier 124-2.

Figure 12:
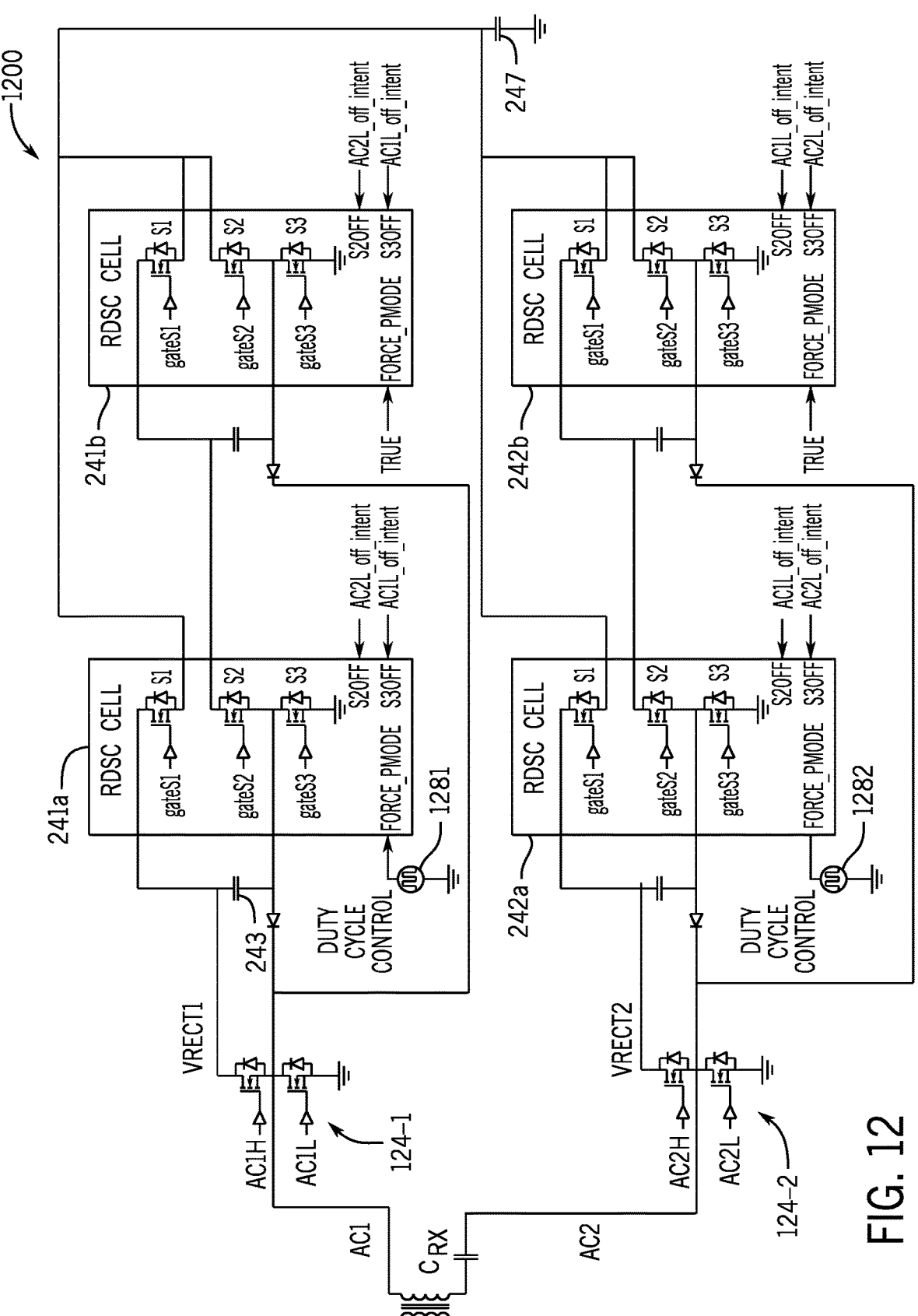
FIG. 12 illustrates a 3:1 rectifier driven switched capacitor system operating at a conversion ratio of less than 2:1.

FIG. 12 illustrates a 3:1 rectifier driven switched capacitor system operating at a conversion ratio of less than 2:1. In this mode, the RDSC cells are connected with their S2OFF, S3OFF, and S2OFF_RELAY terminals connected as described above with respect to FIG. 11A. Additionally, all but the first RDSC cell 241a/242a in each cascade has a logical TRUE value applied to the FORCE_PMODE input, forcing the cell into parallel mode. The first RDSC cell 241a/242a in each cascade has a duty cycle control signal 1281/1282 applied to its respective FORCE_PMODE input. When the duty cycle control signal is high the first RDSC cell in each cascade will be forced into parallel mode, providing a complete passthrough of the rectifier voltage VRECT1/VRECT2 to the output capacitor 247. When the duty cycle control signal is low, the RDSC cell can be operated with series/parallel and parallel/series transitions described above to provide a 2:1 conversion ratio. By varying the duty cycle, any effective conversion ratio between 1:1 (duty cycle control signals 1281/1282 always high) and 2:1 (duty cycle control signals 1281/1282 always low) can be achieved. By selectively enabling additional RDSC cells of the respective cascades, any conversion ratio between 1:1 and (N+1):1 can be provided, where N is the number of RDSC cells in each cascade.

The above-described operation modes can be summarized as follows: When coil current flows from ground to an AC node (AC1/AC2) through a corresponding rectifier low side switch, all RDSC cells in the corresponding cascade can be operated in parallel mode. When coil current flows from AC node (AC1/AC2) into a RDSC cascade through a corresponding rectifier high side switch, the RDSC cascade can choose to operate any number of available cascaded cells in series mode to set the conversion ratio and thereby control the output voltage/current. When the FORCE_PMODE input is FALSE, and coil current flows from CAP_N node into a RDSC cell, the cell automatically transitions into series mode. When the FORCE_PMODE input is TRUE, the cell is forced into parallel mode, regardless the current direction. The FORCE_PMODE input to the RDSC cells can be static values, in which case the RDSC cascade will operate with a selected fixed conversion ratio, e.g., 1:1, 2:1, 3:1, . . . , (N+1):1, where N is the number of cascaded cells. Otherwise, FORCE_PMODE logic to the RDSC cells can also be toggled in every switching period by a duty cycle control signal, in which case, the RDSC cascade can operate in continuous conversion ratio from 1:1 to (N+1):1. Additionally, at any time, for each RDSC cell that is in parallel mode, all of its downstream cells (cells towards Vout, further from rectifier in electrical sense) must be also in parallel mode. By controlling the number of cells in series mode, as well as the timing to enter series mode, coil voltage, and consequently output power, can be controlled.

Figure 13A:
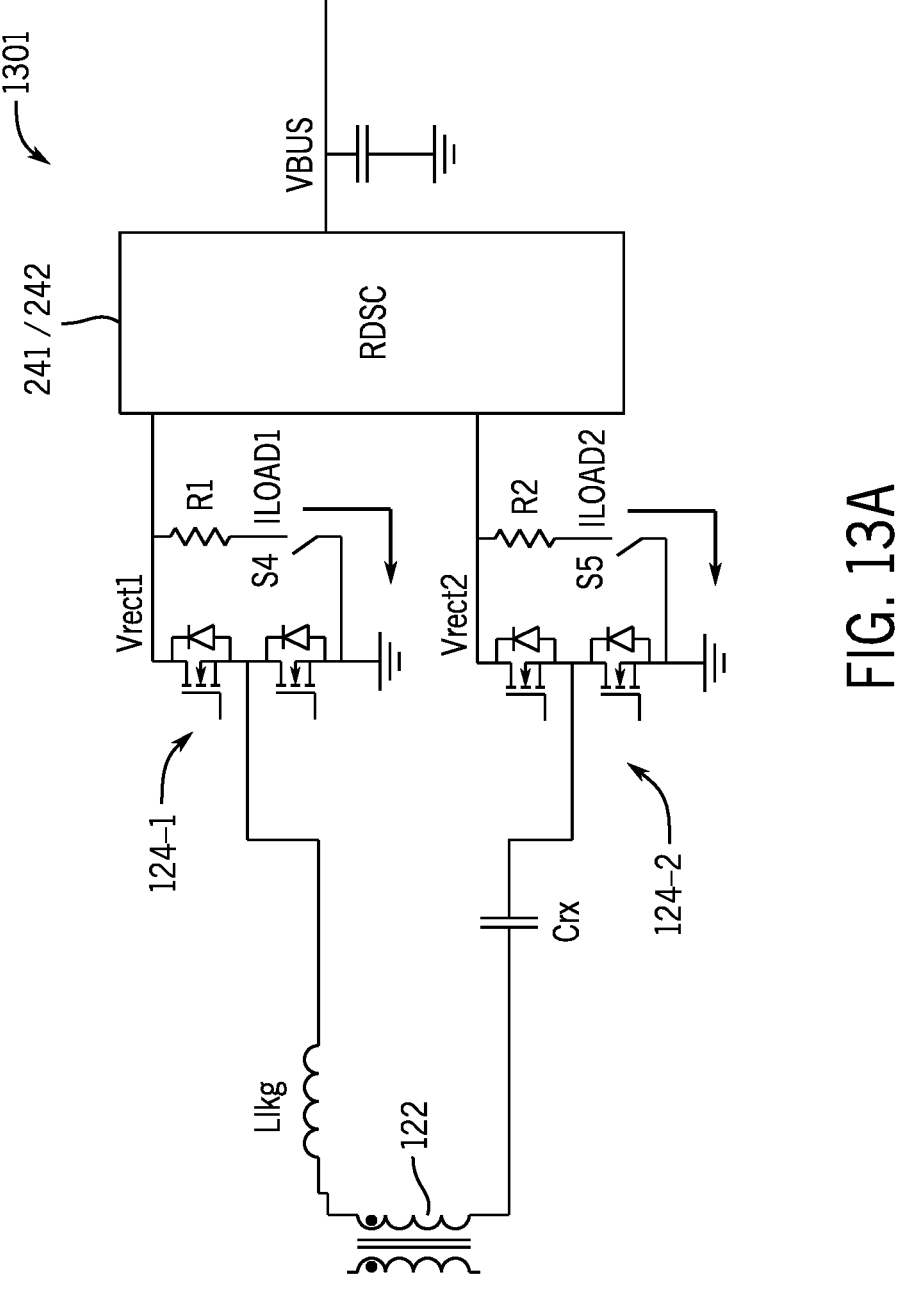
FIGS. 13A-13C illustrate alternative amplitude shift keying (ASK) configurations to facilitate wireless power receiver to wireless power transmitter communication in a wireless power transfer system.
Figure 13B:
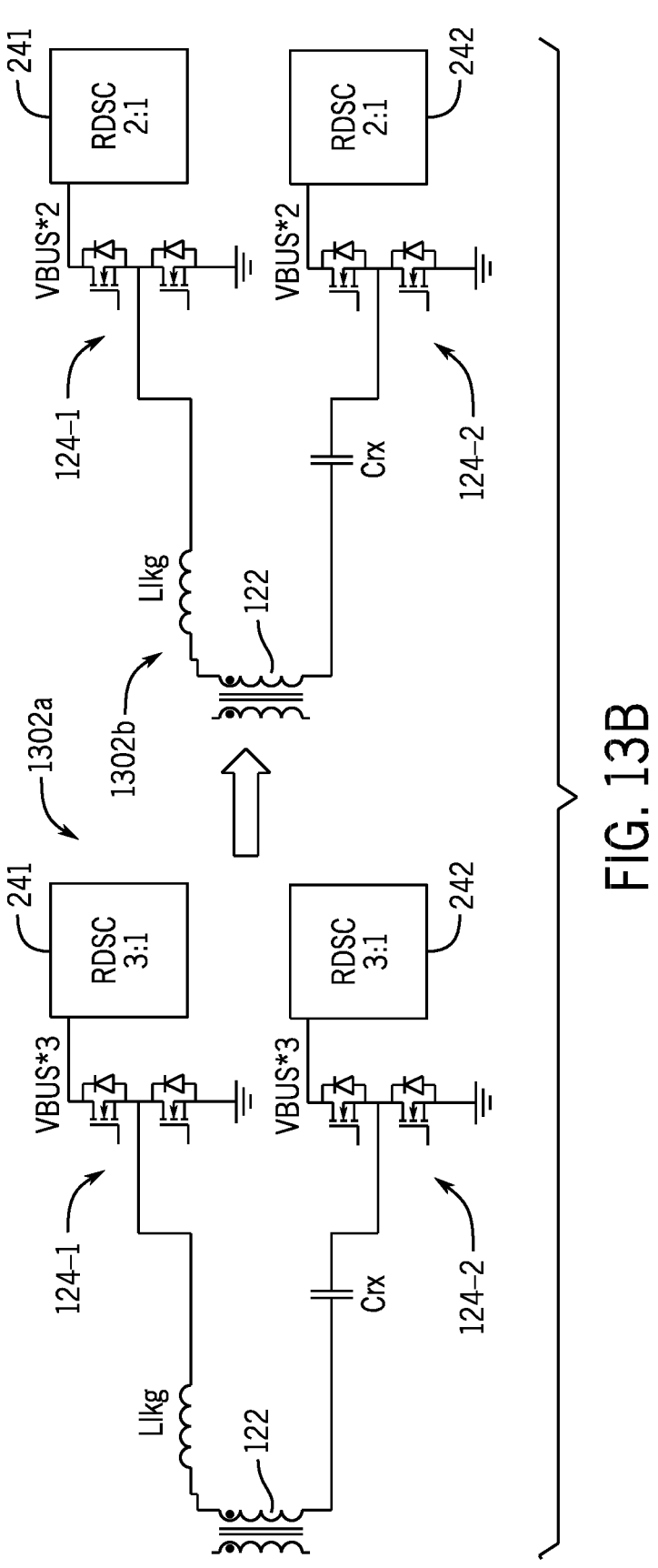
Figure 13C:
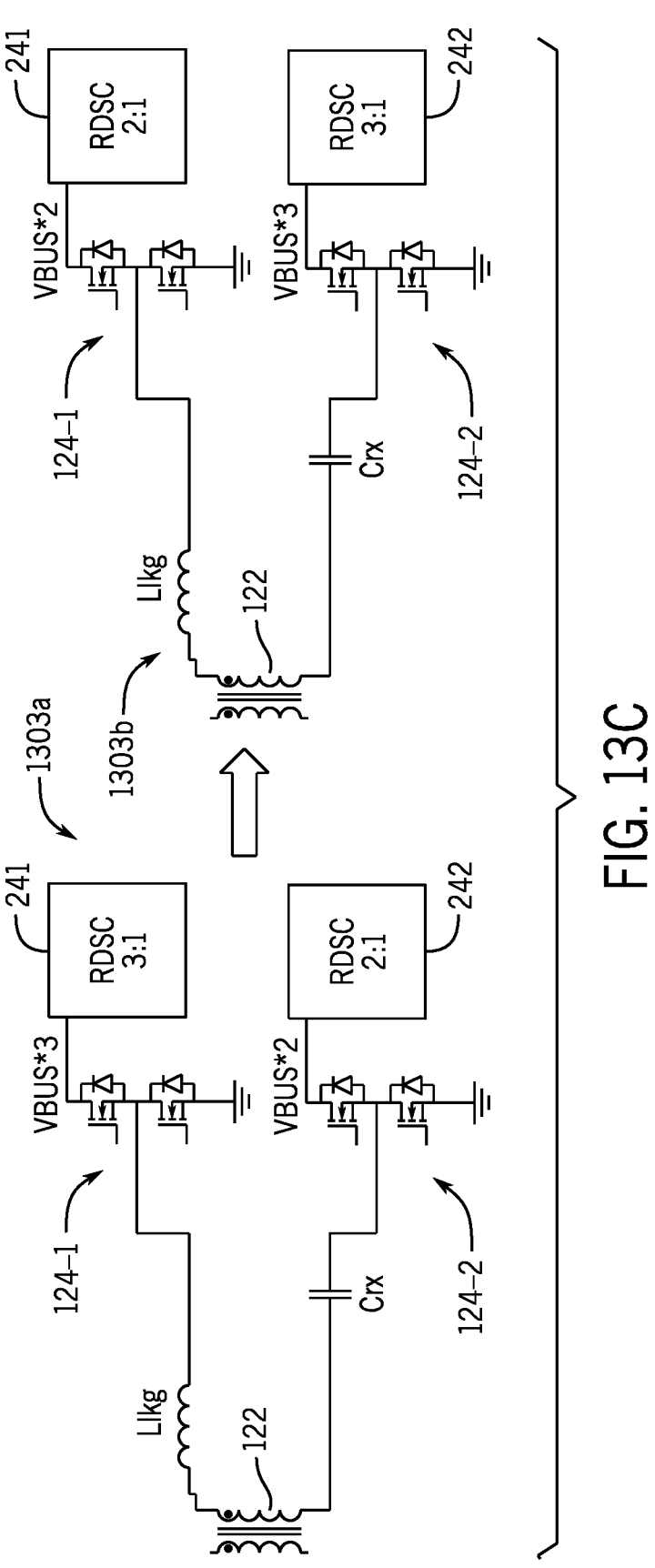

In at least some wireless power transfer systems, it may be desirable to provide in-band communications between a wireless power transmitter (PTx) and a wireless power receiver (PRx). As one example, a PRx can communicate with a PTx by modulating the amplitude of the current/load power drawn by the receiver to encode data for detection and decoding by the PTx. Although the details of these arrangements can take a variety of forms, they may be considered as relying on amplitude shift keying (ASK) of the received current/power. FIGS. 13A-13C illustrate a few exemplary alternative amplitude shift keying (ASK) configurations to facilitate wireless power receiver to wireless power transmitter communication in a wireless power transfer system.

FIG. 13A illustrates an RDSC wireless power receiver 1301 that introduces a first controllable/modulatable load current ILOAD1 on the upper rectifier output first controllable/modulatable load current ILOAD2 on the lower rectifier output. During the positive line cycle of the input AC voltage, switch S4 can be controlled to introduce current ILOAD1, which flows from the rectifier output VRECT1 to ground via the load resistance R1. By controlling the switching of switch S4, the load current can be modulated, which can be seen and decoded by the wireless power transmitter using a wide variety of encoding, detection, and decoding schemes. Similarly, during the negative line cycle of the input AC voltage, switch S5 can be controlled to introduce current ILOAD2, which flows from the rectifier output VRECT2 to ground via the load resistance R2. By controlling the switching of switch S5, the load current can be modulated, which can be seen and decoded by the wireless power transmitter using a wide variety of encoding, detection, and decoding schemes. Such implementations may be advantageous in at least some application because they provide for flexibility of communication with minimal effect on power delivered to the output of the RDSC cascade. However, in at least some applications the additional circuitry required may be undesirable.

FIG. 13B illustrates an alternative wireless power receiver that can be configured to have the upper RDSC cascade 241 and lower RDSC cascade 242 switch conversion ratios on the fly. In the illustrated example, the converter can switch between a state 1302*a*, in which the RDSC cascades are operated with a 3:1 conversion ratio and state 1302*b*, in which the RDSC cascades 241/242 are switched are operated with a 2:1 conversion ratio. The system could be configured to operate at and alternate between other conversion ratios, as appropriate for a given topology, operating voltage and load, etc. Such a configuration may be advantageous in at least some applications, because it does not require additional circuitry beyond the RDSC converter itself. However, such a communication mode may be best used with relatively fast data rates to avoid recurring changes to the power delivery that could result from long-term changes of the overall conversion ratio.

FIG. 13C illustrates an alternative wireless power receiver that can be configured to have the upper RDSC cascade 241 and lower RDSC cascade 242 switch conversion ratios on the fly, but wherein the upper RDSC cascade 241 and lower RDSC cascade 242 switch conversion ratios alternately, but not in the same switching cycle. In the illustrated example, the converter can switch between a state 1303*a*, in which upper RDSC cascade 241 is operated with a 3:1 conversion ratio and lower RDSC cascade 242 is operated with a 2:1 conversion ratio, and state 1302*b*, in which the upper RDSC cascade 241 is operated with a 2:1 conversion ratio and lower RDSC cascade 242 is operated with a 3:1 conversion ratio. The system could be configured to operate at and alternate between other conversion ratios, as appropriate for a given topology, operating voltage and load, etc. Such a configuration may be advantageous in at least some applications, because it does not require additional circuitry beyond the RDSC converter itself and may provide less alteration of total power delivery to achieve the desired communications. Additionally, in this example, the wireless power transmitter can detect an asymmetry in the voltage across a capacitor Ctx in series with wireless power transmit winding 112 (analogous to capacitor Crx shown in FIG. 13C; see also FIG. 14). In at least some applications, this detection arrangement can provide better rejection of system load noise and can be lossless. Additionally, the transitions from 2:1 to 3:1 can happen at any time, including mid-cycle, while still achieving ZVS.

Figure 14:
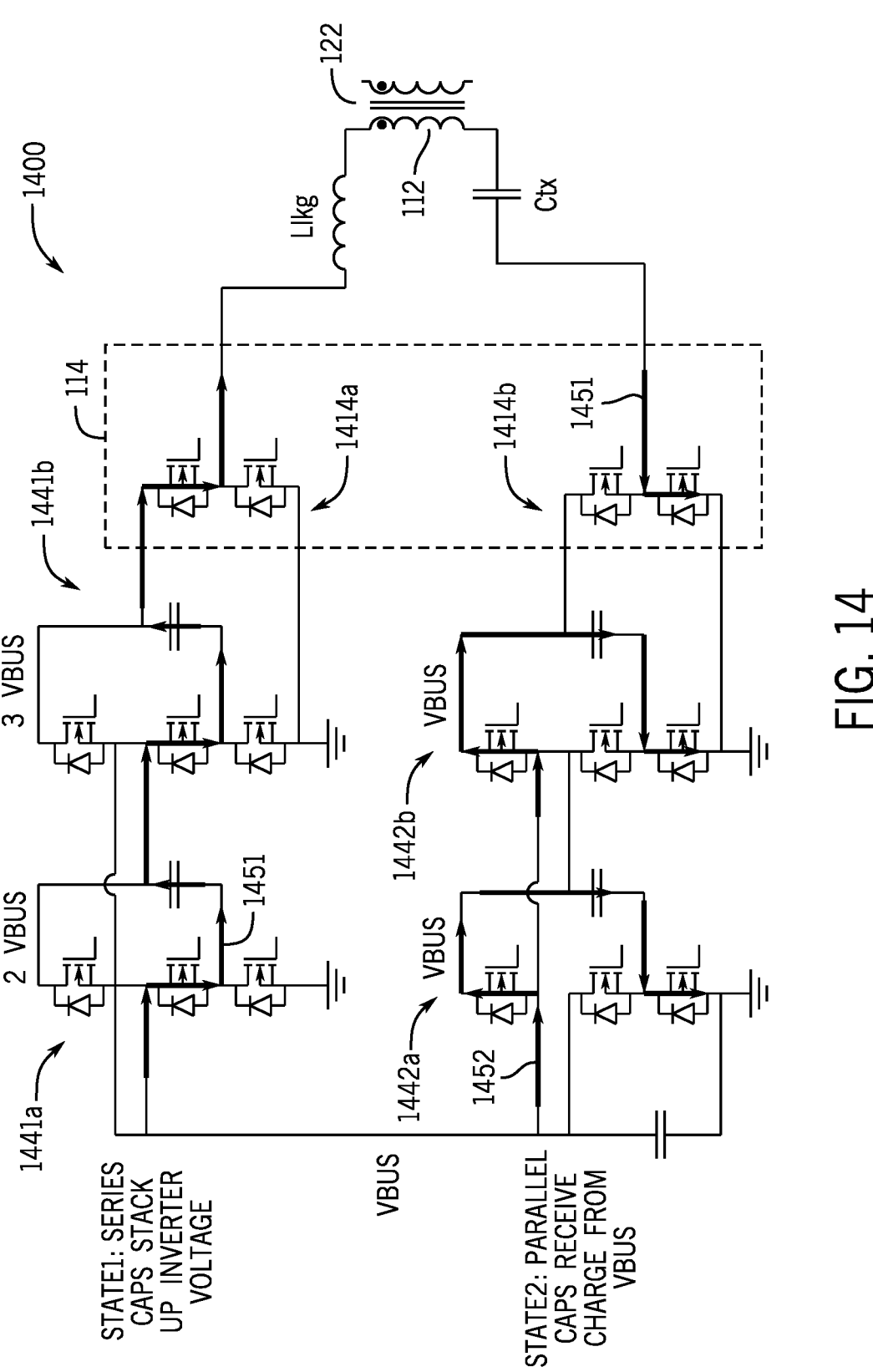
FIG. 14 illustrates an inverter driver switched capacitor converter that can be employed as part of the wireless power transmitter of a wireless power transfer system.

FIG. 14 illustrates an inverter driver switched capacitor ("IDSC") converter 1400 that can be employed as part of the wireless power transmitter of a wireless power transfer system. The IDSC converter employs switched capacitor cells that are analogous to the RDSC cells described above. In the example of FIG. 14, two IDSC cells 1441*a* and 1441*b* are provided in a cascade ahead of a first inverter 1414*a* (analogous to rectifier 124-1) coupled to a first terminal of wireless power transmit winding 112. Similarly, two IDSC cells 1442*a* and 1442*b* are provided in a cascade ahead of a second inverter 1414*b* (analogous to rectifier 124-2) coupled to a second terminal of wireless power transmit winding 112. The IDSC cells may be operated in series mode (e.g., 1441*a*/1441*b*) to provide a stacked inverter voltage to inverter 1414*a* via current 1451. Alternately, the cells may be operated in parallel mode (e.g., 1442*a*/1442*b*) to provide parallel charging of the switched capacitors from the input voltage VBUS via current 1452. Cascading multiple switched capacitor cells can be used to achieve any desired (higher) conversion ratio, and switched capacitor cells can be forced to parallel mode to change conversion ratios on the fly as appropriate for a given input voltage and/or operating condition. Series mode to parallel mode transitions and parallel mode to series mode transitions can be analogous to those described above with respect to the RDSC converter. Additionally, soft switching can be achieved using the inverter reactive current in a manner analogous to that described above with respect to the RDSC converter.

Figure 15:
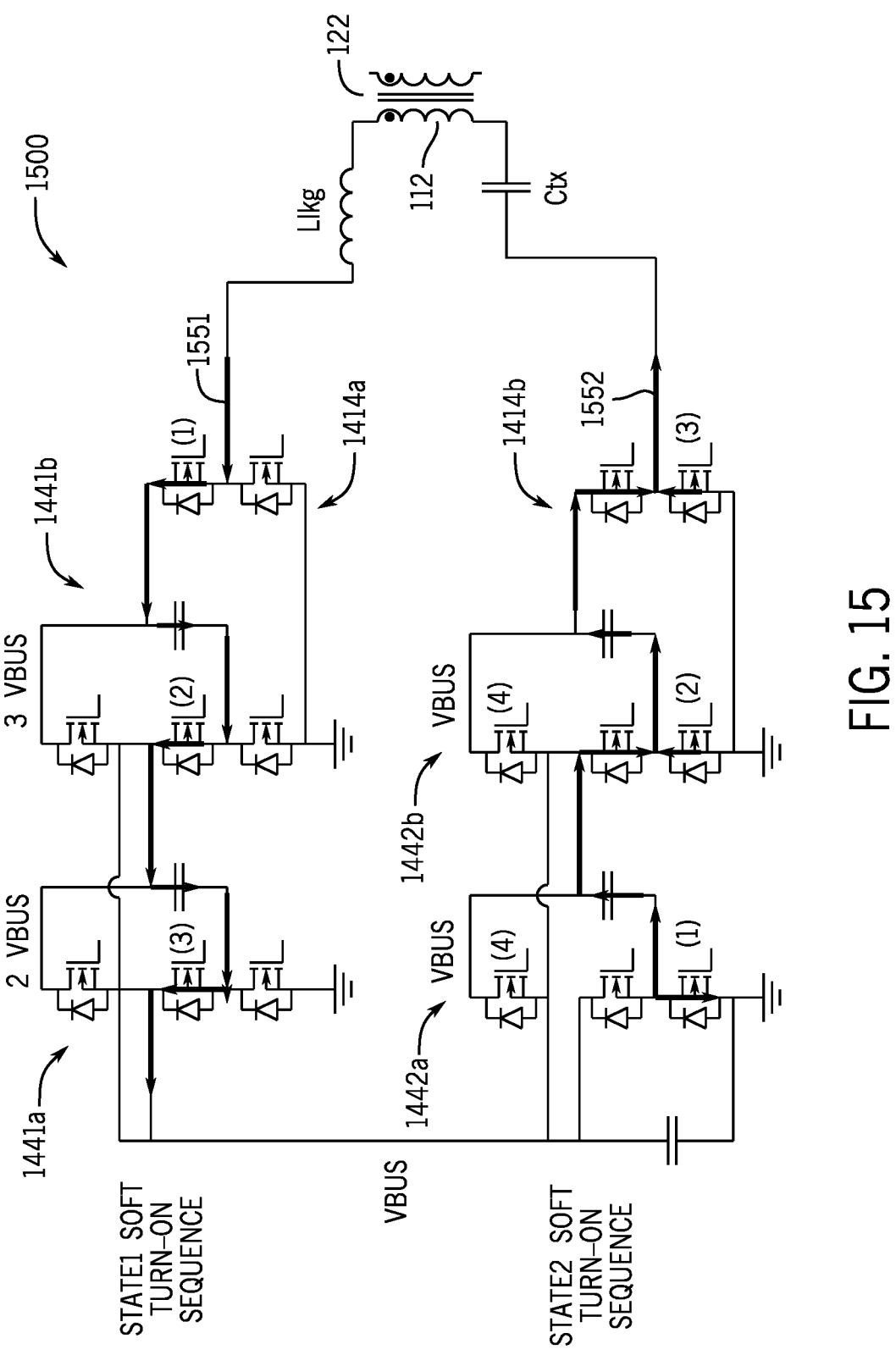
FIG. 15 illustrates soft switching turn on sequences of an inverter driver switched capacitor converter.

FIG. 15 illustrates exemplary soft switching turn on sequences of an inverter driver switched capacitor ("IDSC") converter 1500. The upper cascade of IDSC cells 1441*a*/1441*b* illustrates the series mode turn on sequence to achieve soft switching. To briefly summarize, switching event (1) is turning on the high side switch of inverter 1414*a*, which can be a ZVS transition because of the resonant inverter 1552 current flowing through its intrinsic body diode. This allows current to flow through the flying capacitor of IDSC cell 1441*b* and the intrinsic body diode of the middle switch of IDSC cell 1441*b*. Switching event (2) can thus be turning on this middle switch. This can allow current resonant inverter current 1551 to flow through the flying capacitor and middle switch of IDSC cell 1441*a*. Switching event (3) can thus be turning on this middle switch. To summarize, for transitioning to the series mode, ZVS can be achieved by turning on the upper switch of the inverter and then sequentially turning on the middle switches of each IDSC cell from the inverter to the input bus.

The lower cascade of IDSC cells 1442*a*/1442*b* illustrates a series to parallel mode turn on sequence to achieve soft switching. In switching event (1), the bottom switch of first IDSC cell 1442*a* (i.e., the cell at the input voltage bus VBUS) can be turned on, which is a ZVS transition because of the resonant inverter current through its intrinsic body diode. Then, in switching event (2), the bottom switch of downstream IDSC cell 1442*b* can be turned on, again in a ZVS transition. Then, in switching event (3), the low side switch of inverter 1441, can be turned on, again a ZVS transition. Finally, in switching event 4, the top switches of IDSC cells 1442*a*/1442*b* can be turned on. These may not be strict ZVS events, depending on the charge remaining across the respective flying capacitors, but by careful selection of the capacitor values and switch timings, the switching losses can be minimized.

Figure 16:
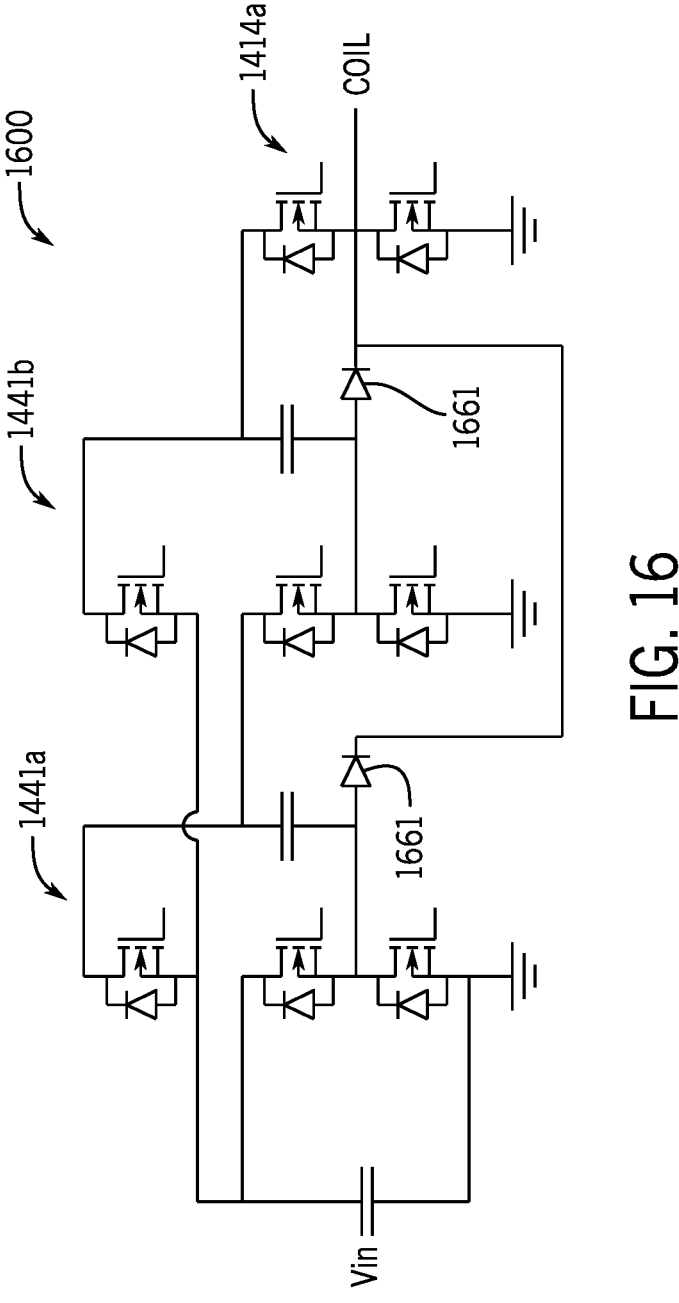
FIG. 16 illustrates a parallel series mode to parallel mode transition for an inverter driver switched capacitor system.

FIG. 16 illustrates further exemplary soft switching turn on sequences of an inverter driver switched capacitor ("IDSC") converter 1600. The configuration and operation of the IDSC converter 1600 of FIG. 16 generally corresponds to that of FIG. 7, which illustrates a simultaneous series mode to parallel mode transition for a rectifier driven switched capacitor system that provides soft switching for all switching devices. In FIG. 16, only one side of the converter is shown, including an input voltage driving an IDSC cascade including first/upstream IDSC cell 1441*a* and second/downstream IDSC cell 1441*b*. As described with respect to the various embodiments above, additional IDSC cells could be provided in the cascade. Also shown in FIG. 16 is one half bridge 1414*a* of the inverter, driving a Coil, i.e., the wireless power transmitter coil. As described with respect to FIG. 7, auxiliary diodes 1661 connect the middle switch/bottom switch connection point, i.e., the second terminal of the flying capacitors of each IDSC cell to the coil, allowing for a soft switching operation as described above in FIG. 7.

Described above are various features and embodiments relating to wireless power transfer devices that include switched capacitor converters. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. Such information may be used in a variety of ways, including those described herein, to enhance the operation of the wireless power transfer system. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A wireless power transmitter comprising:
a first cascade of two or more inverter driver switched capacitor (IDSC) cells coupled between a DC input bus and an input of a first inverter, each IDSC cell comprising a flying capacitor and a plurality of associated switching devices;
a second cascade of two or more IDSC cells coupled between the DC input bus and an input of a second inverter, each IDSC cell comprising a flying capacitor and a plurality of associated switching devices; and
a wireless power transmitter coil having a first terminal coupled to an output of the first inverter and a second terminal coupled to an output of the second inverter;
whereby the first and second cascades of IDSC cells allow selecting a voltage or current conversion ratio based on at least one of DC input bus voltage or other operating condition to reduce losses.

2. The wireless power transmitter of claim 1 wherein for each IDSC cell:

the flying capacitor has a first terminal coupled to an input of the IDSC cell and a second terminal; and
the plurality of switching devices include:
a top switch having a first terminal coupled to the input of the IDSC cell and the first terminal of the flying capacitor and a second terminal coupled to a first output terminal of the IDSC cell, thereby allowing the top switch to selectively couple first terminal of the flying capacitor to the first output terminal of the IDSC cell;
a middle switch having a first terminal coupled to a second output terminal of the IDSC cell and a second terminal coupled to the second terminal of the flying capacitor, thereby allowing the middle switch to selectively couple the second terminal of the flying capacitor to the second output terminal of the IDSC cell; and
a bottom switch having a first terminal coupled to the second terminal of the flying capacitor and the second terminal of the middle switch and a second terminal coupled to ground, thereby allowing the bottom switch to selectively couple the second terminal of the flying capacitor to ground.

3. The wireless power transmitter of claim 2 wherein each IDSC cell further comprises:
a diode having its anode coupled to the second terminal of the flying capacitor and its cathode coupled to the wireless power transmitter coil.

4. The wireless power transmitter of claim 3 wherein:
the first cascade of two or more IDSC cells further comprises:
a first upstream IDSC cell having its input terminal coupled to the DC input bus and its first output terminal coupled to the input of the first inverter; and
a first downstream IDSC cell having its input terminal coupled to the second output terminal of the first upstream IDSC cell and its first and second output terminals coupled to the input of the first inverter; and
the second cascade of two or more IDSC cells further comprises:
a second upstream IDSC cell having its input terminal coupled to the DC input bus and its first output terminal coupled to the input of the second inverter; and
a second downstream IDSC cell having its input terminal coupled to the second output terminal of the second upstream IDSC cell and its first and second output terminals coupled to the input of the second inverter.

5. The wireless power transmitter of claim 4 wherein the first and second cascades of IDSC cells each further comprise one or more intermediate IDSC cells, with each intermediate IDSC cell having its input terminal coupled to an immediately upstream IDSC cell, its first output terminal coupled to the input of either the first or second inverter, and its second output terminal coupled to an immediately downstream IDSC cell.

6. The wireless power transmitter of claim 2 wherein:
the first cascade of two or more IDSC cells further comprises:
a first upstream IDSC cell having its input terminal coupled to the DC input bus and its first output terminal coupled to the input of the first inverter; and
a first downstream IDSC cell having its input terminal coupled to the second output terminal of the first upstream IDSC cell and its first and second output terminals coupled to the input of the first inverter; and the second cascade of two or more IDSC cells further comprises:

a second upstream IDSC cell having its input terminal coupled to the DC input bus and its first output terminal coupled to the input of the second inverter; and a second downstream IDSC cell having its input terminal coupled to the second output terminal of the second upstream IDSC cell and its first and second output terminals coupled to the input of the second inverter.

7. The wireless power transmitter of claim 6 wherein the first and second cascades of IDSC cells each further comprise one or more intermediate IDSC cells, with each intermediate IDSC cell having its input terminal coupled to an immediately upstream IDSC cell, its first output terminal coupled to the input of either the first or second inverter, and its second output terminal coupled to an immediately downstream IDSC cell.

8. A wireless power transmitter comprising:

first cascade of two or more inverter driver switched capacitor (IDSC) cells coupled between a DC input bus and an input of a first inverter;

a second cascade of two or more IDSC cells coupled between the DC input bus and an input of a second inverter; and a wireless power transmitter coil having a first terminal coupled to an output of the first inverter and a second terminal coupled to an output of the second inverter; and control circuitry that:

operates the first cascade of two or more IDSC cells in a series mode to cause the first and second inverters to produce a positive half cycle and in a parallel mode to cause the first and second inverters to produce a negative half cycle; and operates the second cascade of two or more IDSC cells in a series mode to cause the first and second inverters to produce a negative half cycle and in a parallel mode to cause the first and second inverters to produce a positive half cycle.

9. The wireless power transmitter of claim 8 wherein control circuitry sequences switching of switching devices of each cascade of IDSC cells to achieve zero voltage switching.

10. The wireless power transmitter of claim 9 wherein the control circuitry sequences switching of a cascade of IDSC cells undergoing a parallel mode to series mode transition to achieve zero voltage switching by:

simultaneously turning off all top and bottom switches of the cascade of IDSC cells undergoing a parallel mode to series mode transition;

turning off a low side switch of a corresponding inverter;

turning on a high side switch of a corresponding inverter; and subsequently turning on middle switches of the IDSC cells in sequence from downstream to upstream.

11. The wireless power transmitter of claim 10 wherein the control circuitry subsequently turns on middle switches of the IDSC cells upon their body diode conduction.

12. The wireless power transmitter of claim 9 wherein the control circuitry sequences switching of a cascade of IDSC cells undergoing a parallel mode to series mode transition by:

turning off a low side switch of a corresponding inverter;

turning on a high side switch of a corresponding inverter; and subsequently turning on middle switches of the IDSC cells in sequence from downstream to upstream.

13. The wireless power transmitter of claim 9 wherein the control circuitry sequences switching of a cascade of IDSC cells undergoing a series mode to parallel mode transition by:

turning off a middle switch of a most upstream IDSC cell in the cascade of IDSC cells undergoing a series mode to parallel mode transition;

turning on a bottom switch of the most downstream IDSC cell upon its body diode conduction, and then turning on a top switch of the most downstream IDSC cell;

turning off a middle switch of an adjacent downstream IDSC cell;

turning on a bottom switch of the adjacent downstream IDSC cell upon its body diode conduction, and then turning on a top switch of the adjacent downstream IDSC cell; and turning on a low side switch of a corresponding inverter.

14. The wireless power transmitter of claim 9 wherein the control circuitry sequences switching of a cascade of IDSC cells undergoing a series mode to parallel mode transition by:

simultaneously turning off a middle switch of all IDSC cells in the cascade of IDSC cells undergoing a series mode to parallel mode transition and turning off a high side switch of an inverter corresponding to the cascade of IDSC cells;

simultaneously turning on a bottom switch and a top switch of each IDSC cell in the cascade of RDSC cells undergoing a series mode to parallel mode transition; and turning on a low side switch of an inverter corresponding to the cascade of IDSC cells undergoing a series mode to parallel mode transition.

15. The wireless power transmitter of claim 14:

wherein waiting for the coil current to discharge a voltage on a second terminal of each flying capacitor through an auxiliary diode of each IDSC cell after simultaneously turning off the middle switch of all IDSC cells and turning off a high switch of the inverter; and wherein simultaneously turning on the bottom switch and the top switch of each IDSC cell occurs upon completion of discharging the voltage on the second terminal of each flying capacitor.

*   *   *   *   *